(12) United States Patent
Lee et al.

(10) Patent No.: US 12,466,928 B2
(45) Date of Patent: Nov. 11, 2025

(54) COMPLEX AND MATERIAL CONTAINING SAME FOR OIL-WATER SEPARATION

(71) Applicant: University of Ulsan Foundation for Industry Cooperation, Ulsan (KR)

(72) Inventors: Byeong-Kyu Lee, Ulsan (KR); Viet Ha Tran Thi, Ulsan (KR)

(73) Assignee: University of Ulsan Foundation for Industry Cooperation, Ulsan (KR)

( * ) Notice: Subject to any disclaimer, the term of this patent is extended or adjusted under 35 U.S.C. 154(b) by 1138 days.

(21) Appl. No.: 16/759,011

(22) PCT Filed: Oct. 11, 2018

(86) PCT No.: PCT/KR2018/011935
§ 371 (c)(1),
(2) Date: Sep. 30, 2020

(87) PCT Pub. No.: WO2019/083198
PCT Pub. Date: May 2, 2019

(65) Prior Publication Data
US 2021/0179797 A1    Jun. 17, 2021

(30) Foreign Application Priority Data

Oct. 25, 2017 (KR) .................. 10-2017-0139210
Nov. 1, 2017 (KR) .................. 10-2017-0144611
(Continued)

(51) Int. Cl.
*C08J 9/00*    (2006.01)
*B01D 17/02*   (2006.01)
(Continued)

(52) U.S. Cl.
CPC ............ *C08J 9/0066* (2013.01); *B01D 17/02* (2013.01); *C02F 1/40* (2013.01); *C08J 7/06* (2013.01);
(Continued)

(58) Field of Classification Search
None
See application file for complete search history.

(56) References Cited

U.S. PATENT DOCUMENTS

2005/0182174 A1* 8/2005 Michael ................... C09D 7/61
524/430
2016/0069035 A1* 3/2016 Wang .................... B01J 20/3272
210/671
2017/0056834 A1* 3/2017 Bhushan .................. C08K 3/36

FOREIGN PATENT DOCUMENTS

KR    100786678 B1    12/2007

OTHER PUBLICATIONS

Li, Beibei et al., "Rapid adsorption for oil using superhydrophobic and superoleophilic polyurethane sponge", Journal of Chemical Technology and Biotechnology, 2015, 90, 2106-2112.
(Continued)

*Primary Examiner* — Chinessa T. Golden
(74) *Attorney, Agent, or Firm* — Myers Bigel, P.A.

(57) ABSTRACT

The present invention relates to a complex and a material containing the same for oil-water separation. The preparation process of the complex is simple. The complex shows lipophilicity, superhydrophobicity, and super water-repellency since a zinc oxide particle layer, in which zinc oxide particles are agglomerated in a micro-nano structure, and a super-hydrophobic coating layer having low surface energy are sequentially formed on a surface of a polymer matrix having a cavernous porous structure, and thus the complex has high oil-water separation efficiency and high durability. When a magnetic particle layer exhibiting magnetism is
(Continued)

provided between the zinc oxide particle layer and the super-hydrophobic coating layer, the positional control and collection of the complex is easy, and thus the complex can be helpfully used as a material for oil absorption type oil-water separation, which is used in large-scale oil-water separation, such as the removal of oil spilled into the ocean.

7 Claims, 13 Drawing Sheets

(30) Foreign Application Priority Data

Apr. 11, 2018 (KR) .................. 10-2018-0042046
Apr. 11, 2018 (KR) .................. 10-2018-0042049

(51) Int. Cl.
| | |
|---|---|
| *C02F 1/40* | (2023.01) |
| *C08J 7/06* | (2006.01) |
| *C08J 9/36* | (2006.01) |
| *C08K 3/22* | (2006.01) |
| *C08K 5/09* | (2006.01) |
| *C08K 5/54* | (2006.01) |
| *C08L 61/28* | (2006.01) |

(52) U.S. Cl.
CPC .................. *C08J 9/365* (2013.01); *C08K 3/22* (2013.01); *C08K 5/09* (2013.01); *C08K 5/54* (2013.01); *C08L 61/28* (2013.01); *C08K 2003/2296* (2013.01)

(56) References Cited

OTHER PUBLICATIONS

Beshkar, Farshad et al., "Recyclable magnetic superhydrophobic straw soot sponge for highly efficient oil/water separation." Journal of Colloid and Interface Science, Feb. 12, 2017, 497, 57-65.

Liu, Lei, "A facile method to fabricate the superhydrophobic magnetic sponge for oil-water separation." Materials Letters, May 15, 2017, 195, 66-70.

Badre, Chantal, "Effects of nanorod structure and conformation of fatty acid self-assembled layers on superhydrophobicity of zinc oxide surface." Journal of Colloid and Interface Science, 2007, 316, 233-237.

Tran, Viet-Ha Thi et al., "Novel fabrication of a robust superhydrophobic sponge and its application in oil-water separations." Scientific Reports, Dec. 13, 2017, Article 17520, 1-12.

* cited by examiner

[FIG. 1]
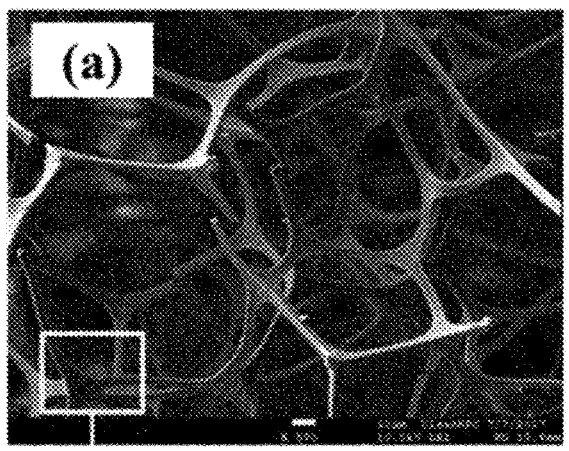
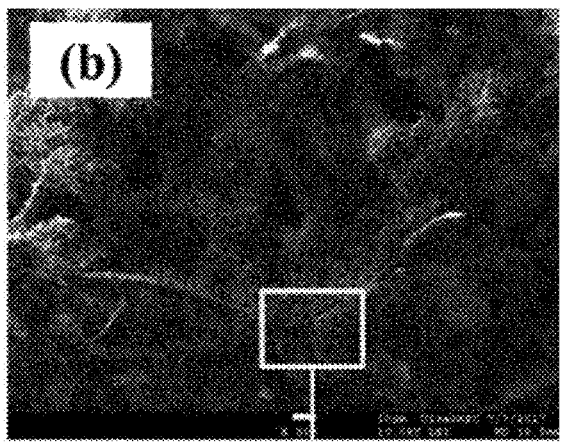
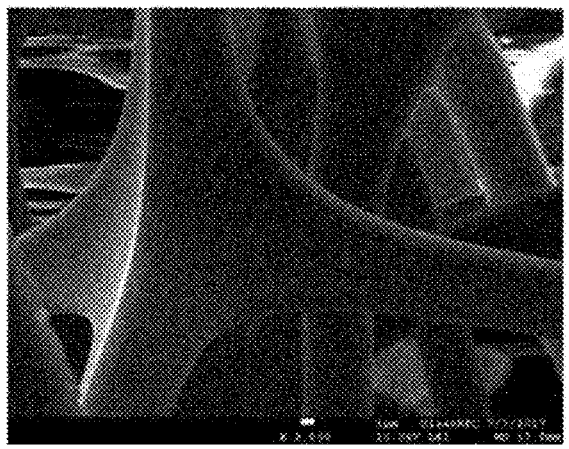
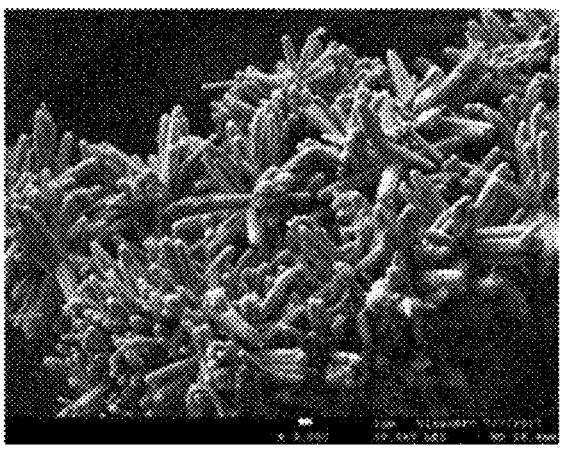

[FIG. 2]
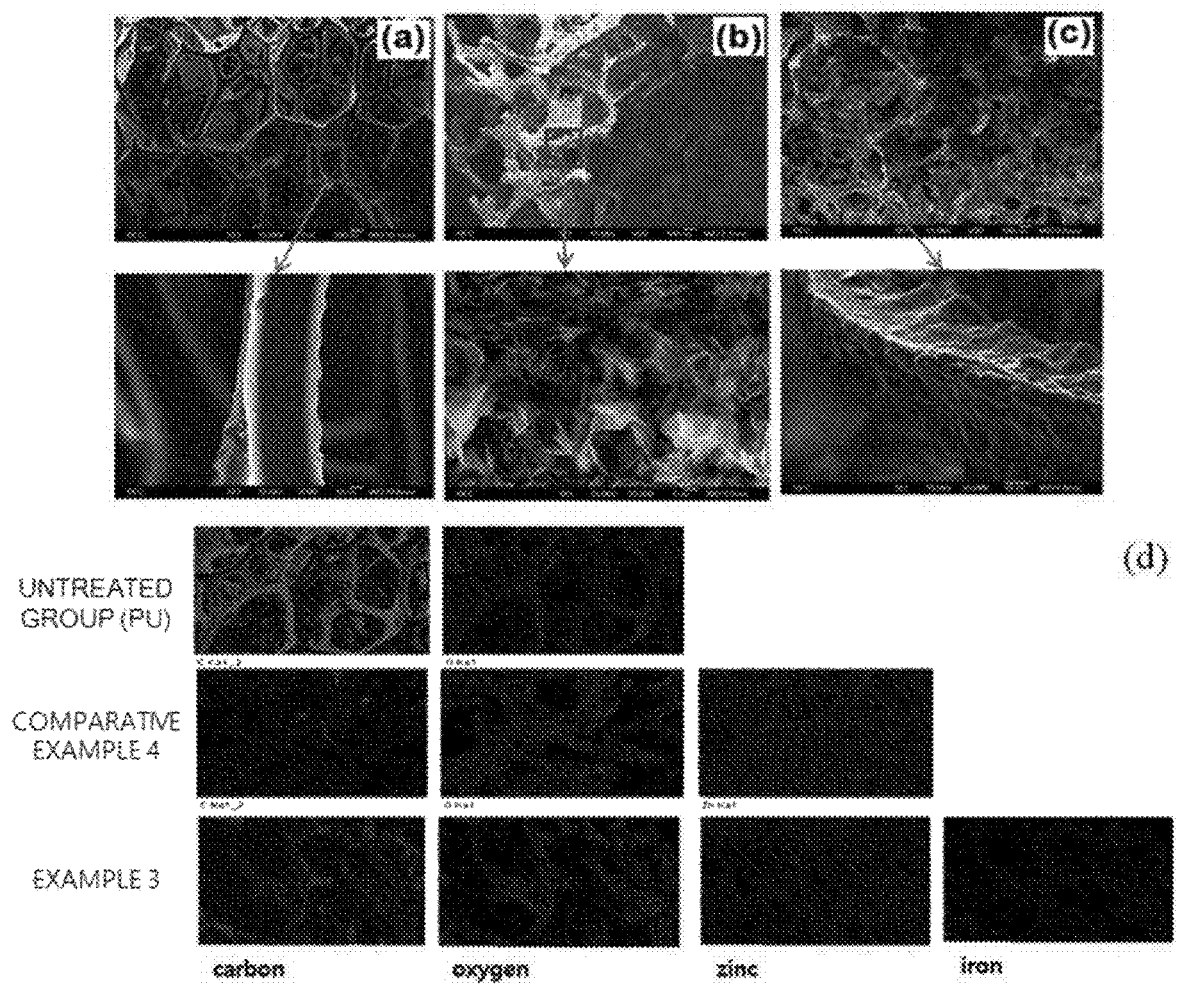

[FIG. 3]
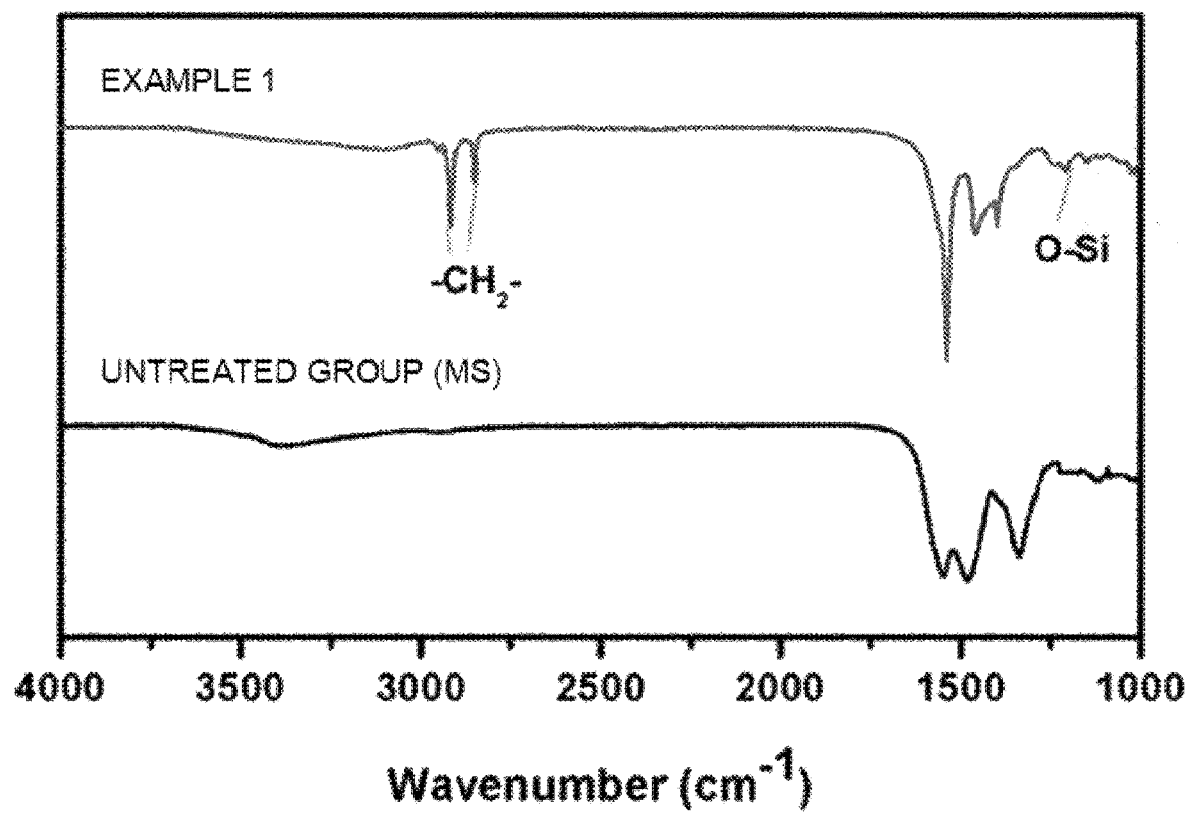

[FIG. 4]
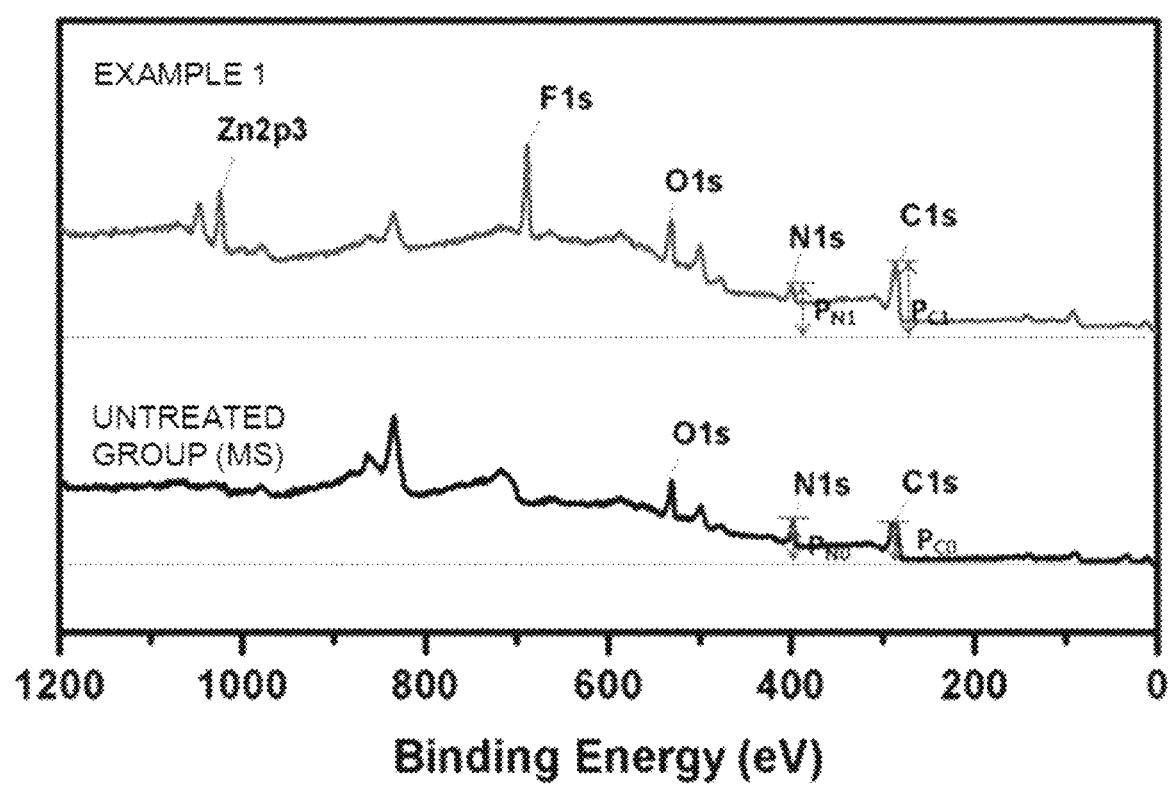

[FIG. 5]
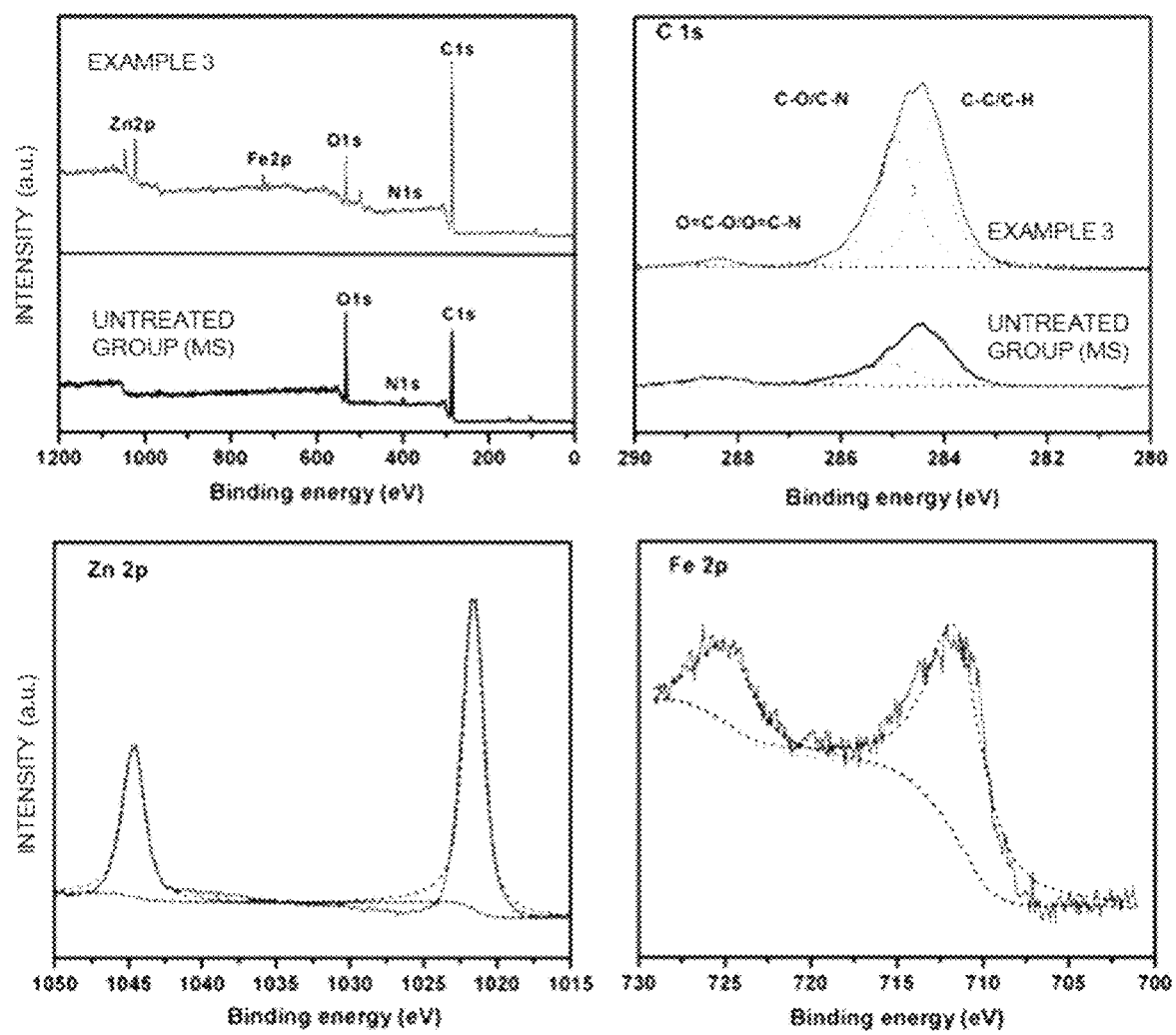

[FIG. 6]
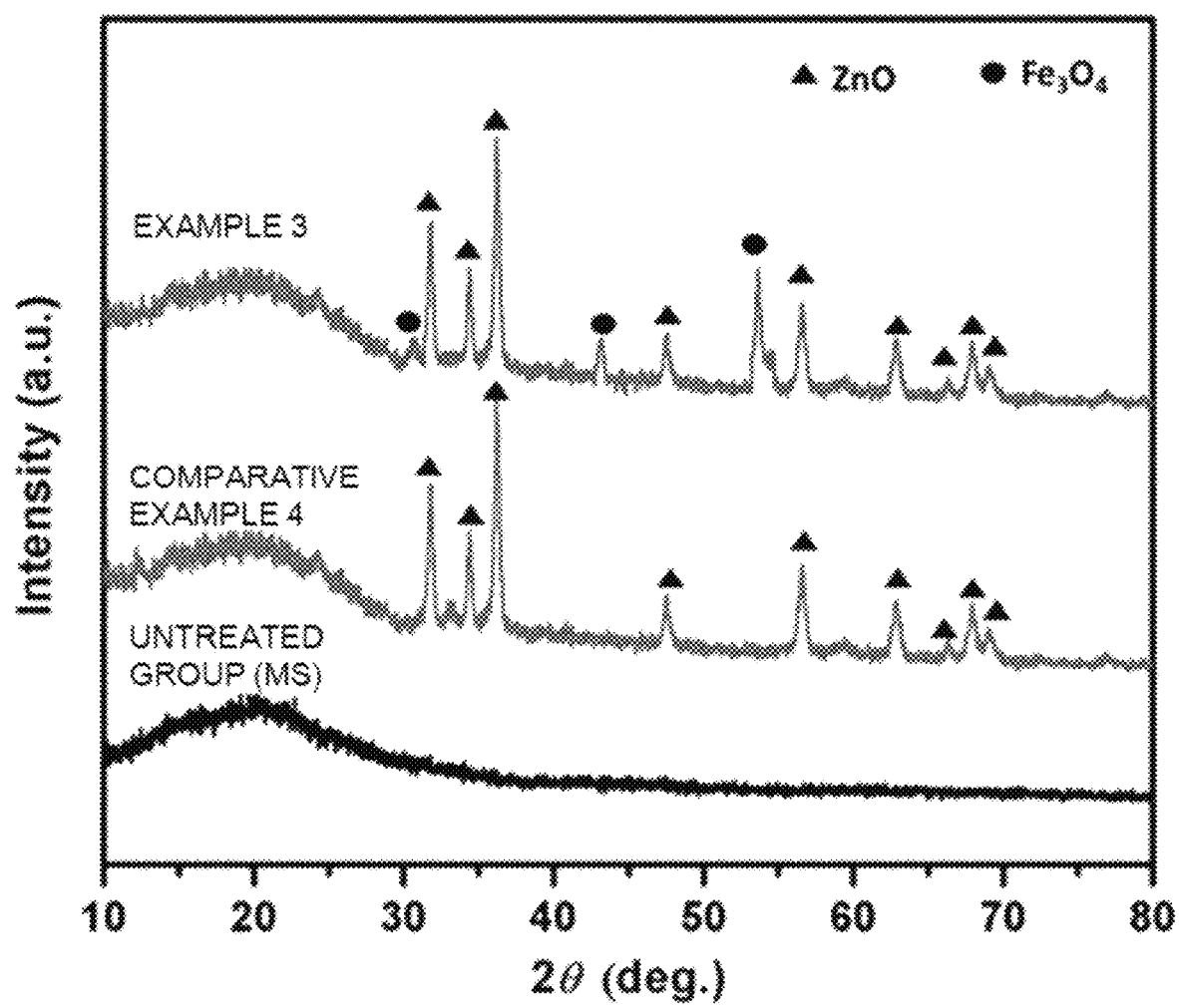

[FIG. 7]
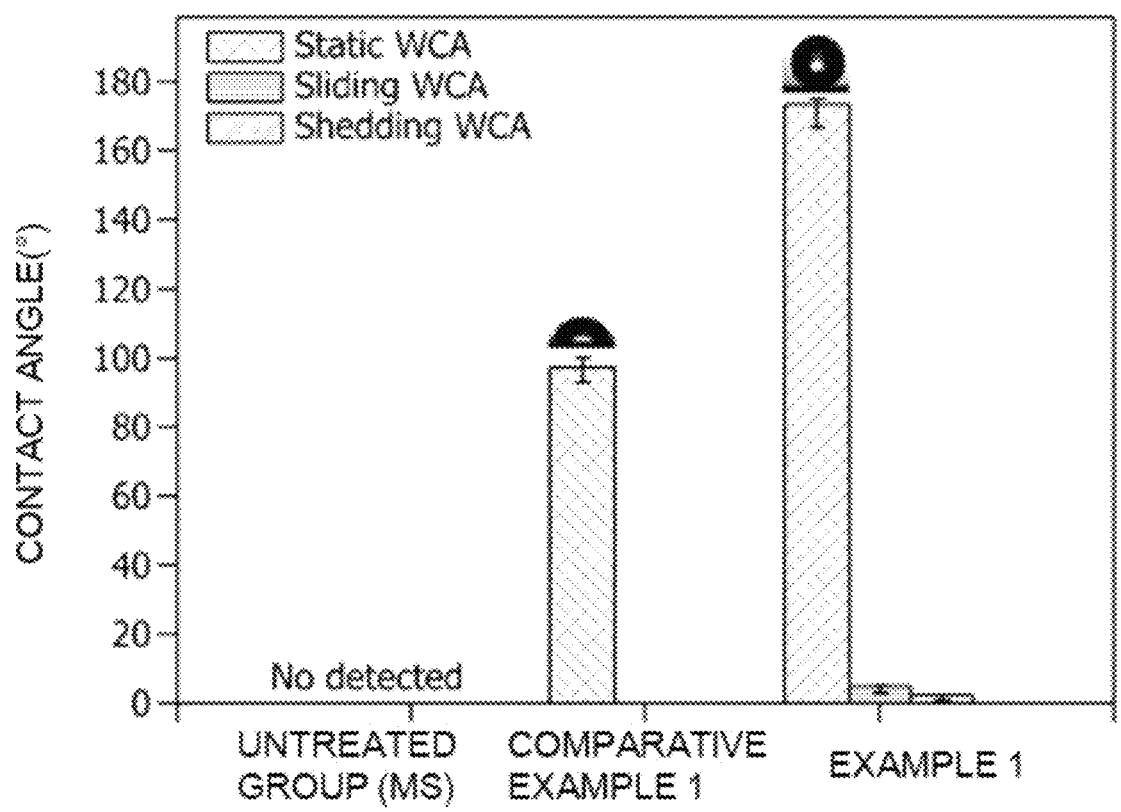

[FIG. 8]
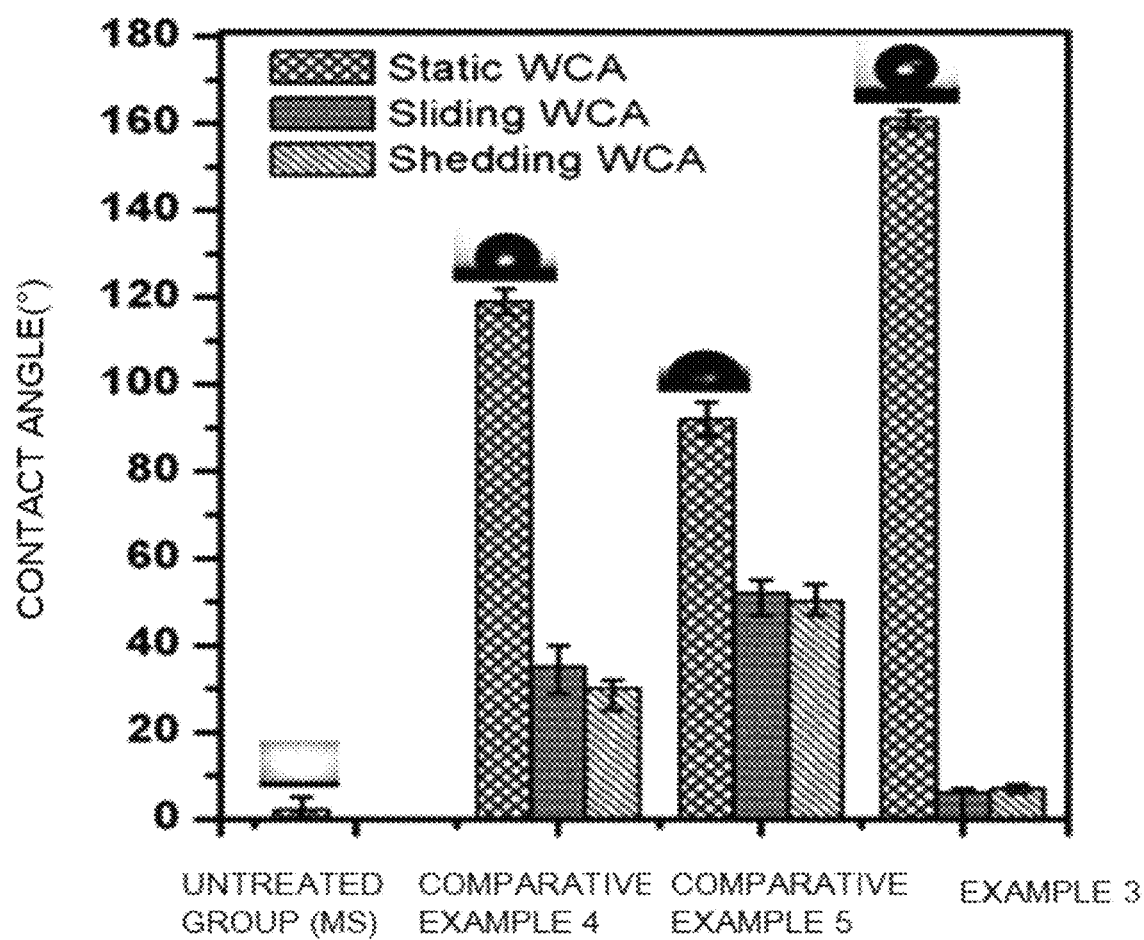

[FIG. 9]
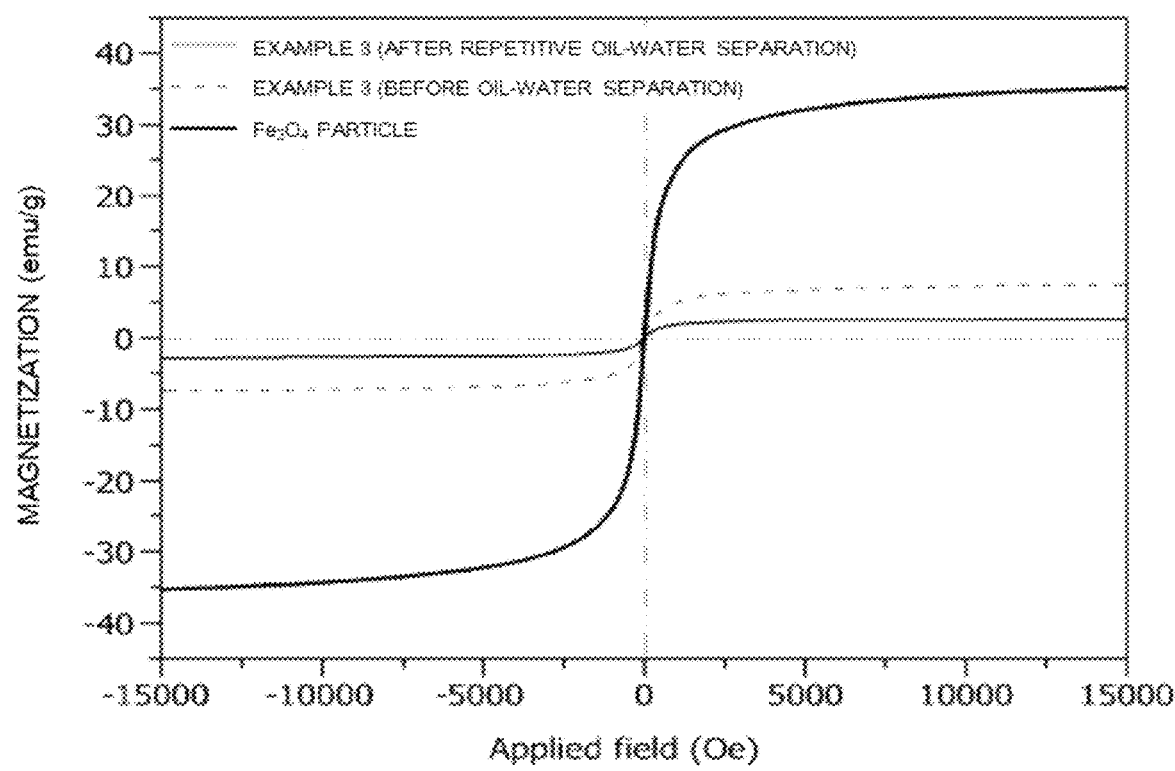

[FIG. 10]
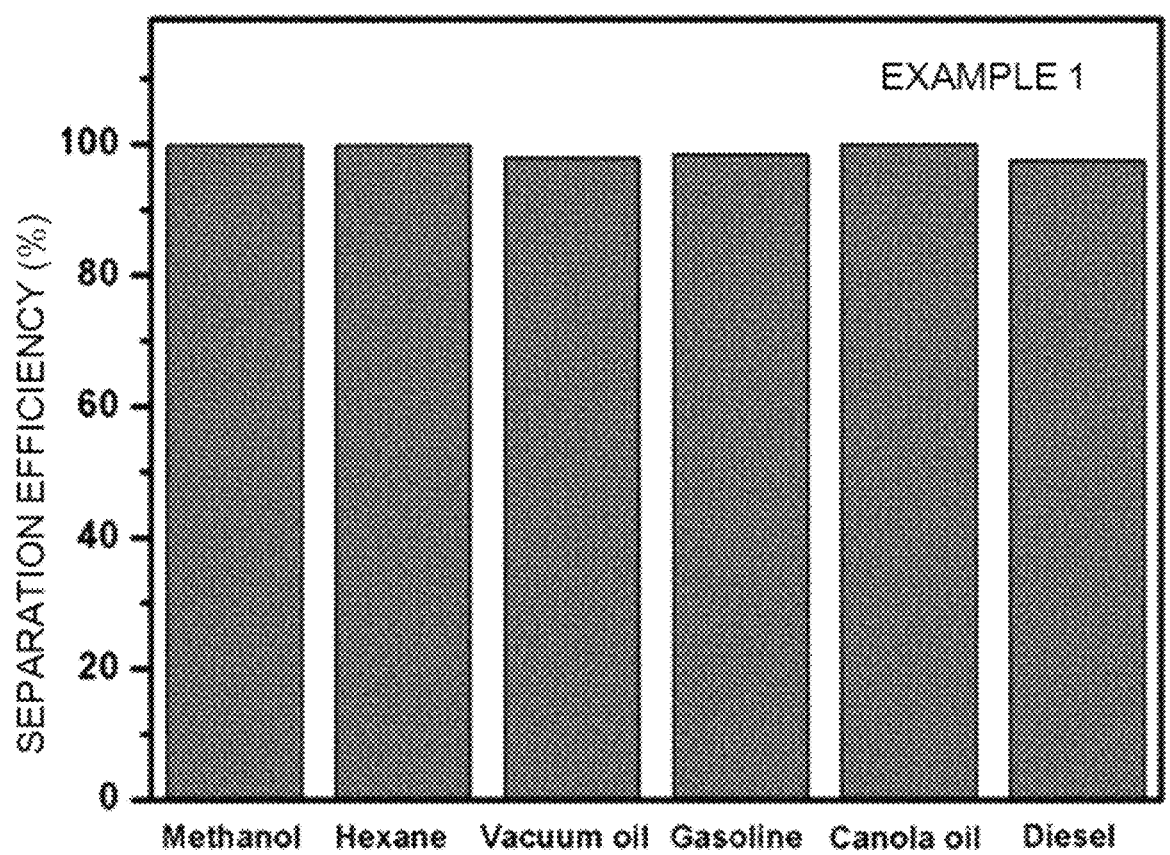

[FIG. 11]
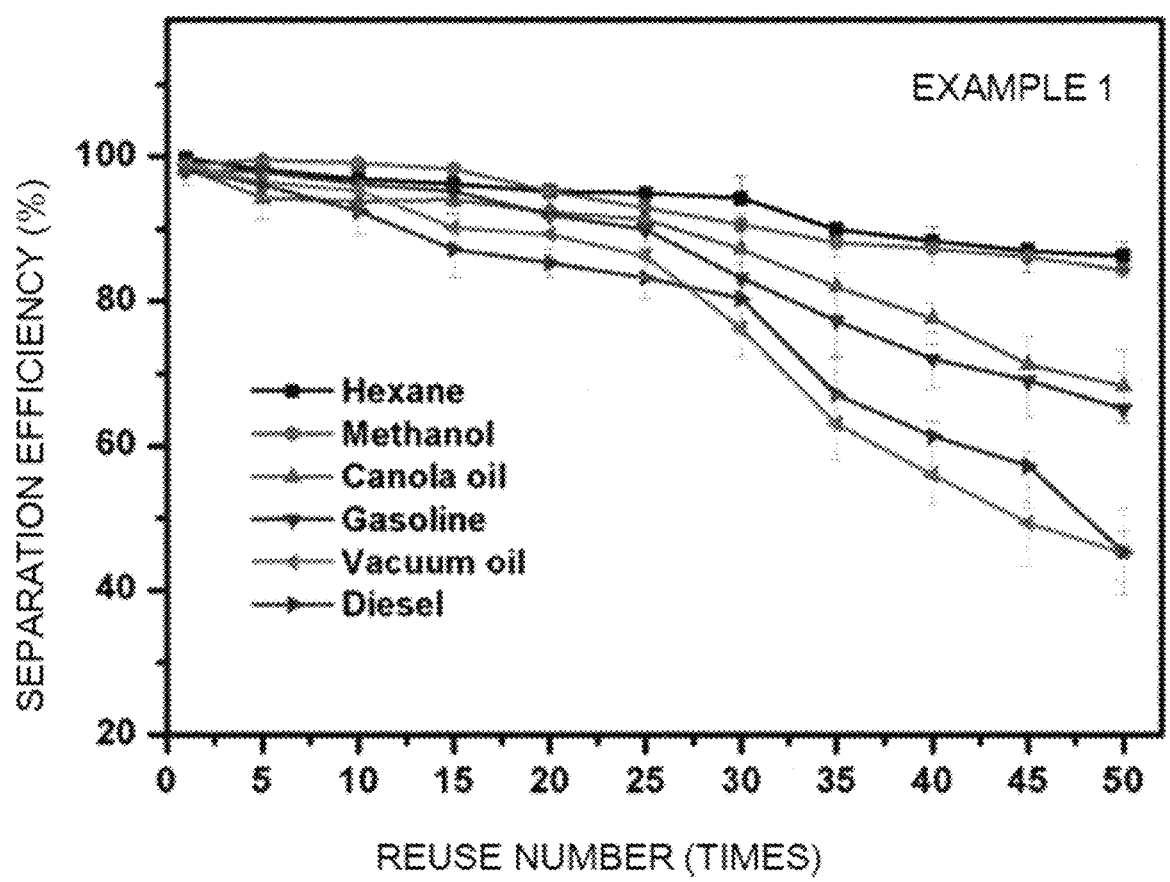

[FIG. 12]
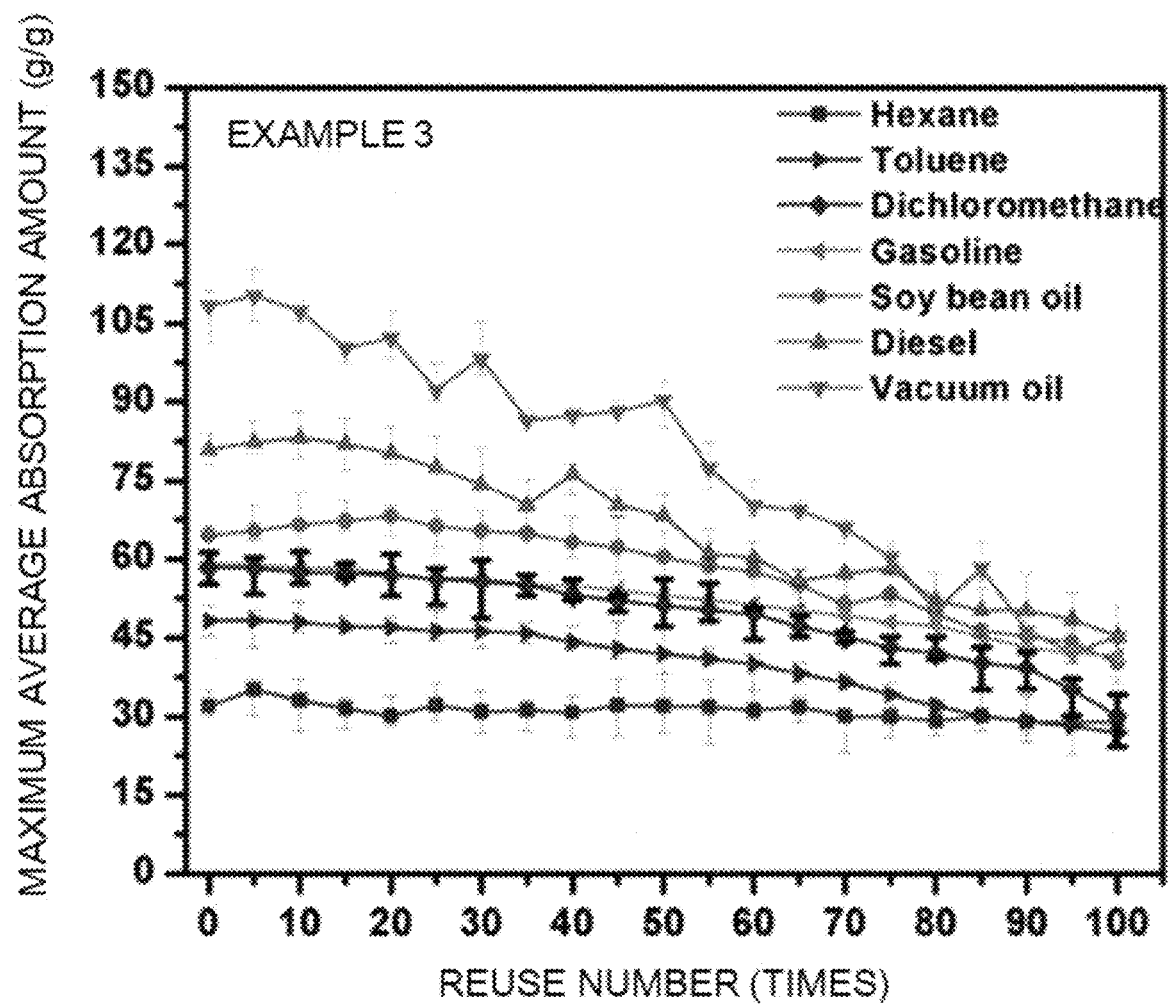

[FIG. 13]
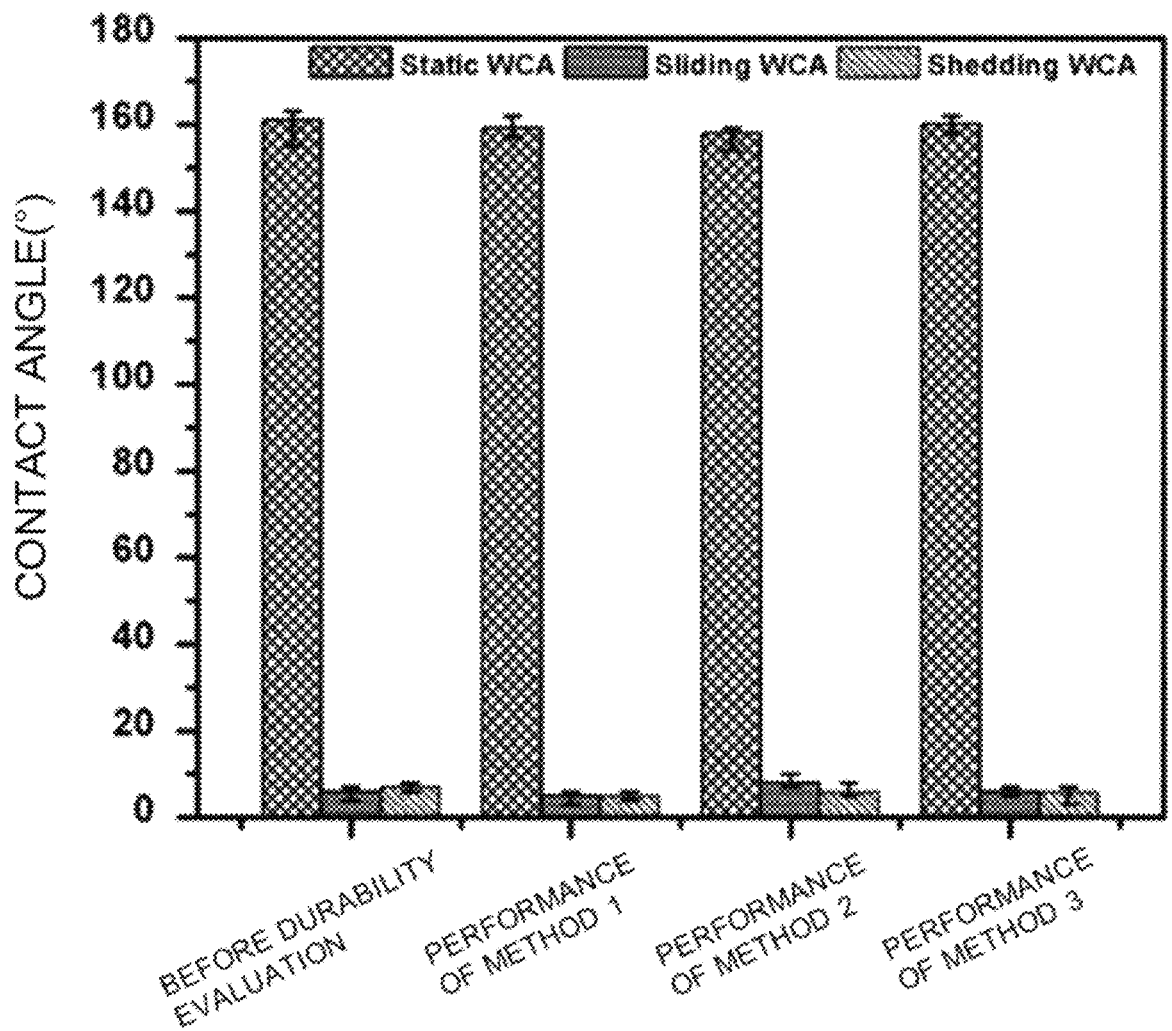

COMPLEX AND MATERIAL CONTAINING SAME FOR OIL-WATER SEPARATION

TECHNICAL FIELD

The present invention relates to a complex based on a polymer matrix having a cavernous porous structure and an oil-water separation material including the same.

BACKGROUND ART

Recently, as environmental issues have emerged as important issues, the interest in oil-water separation materials for removing pollutants present in water has increased. In addition, as research on high-performance separation materials, the application of the same, and the diversification of the application area of the same has been actively conducted, the demand for the separation materials is increasing.

As an oil-water separation method commonly used in conventional cases, there are a specific gravity separation method, an adsorption method, and the like. Among these methods, the specific gravity separation method has an advantage in which the method is simple in structure by requiring fewer mechanical operating parts and it is possible to reduce costs by not using consumable supplies that require replacement, such as a filter. However, since the specific gravity separation method has low oil separation efficiency such that the separated and discharged oil includes a high content of water ($H_2O$), it is difficult to recycle the oil, and the total amount is increased as water is mixed, thereby increasing the cost for disposal or treatment of oil. In addition, since the specific gravity separation method does not have high oil-water separation capacity, when this method is applied in a wide contamination range such as an oil spill in the sea or river, oil cannot be effectively separated in a short period of time, thereby there is a limitation that it is difficult to control.

As an alternative to this, an in-depth study is being conducted on the development of an optimal preparation process of an adsorptive separation material for manifesting the characteristics thereof and a technique of preparing a separation material having high functionality provided through a surface treatment technique.

As an example, as in Korean Registered Patent No. 10-0786678, a technique of improving the oil-water separation capacity of the polymer material used as a disc or filter in the adsorption method by modifying the surface of the polymer material through a plasma surface treatment technique has been developed. However, the technique has high preparation costs because a surface treatment process such as plasma treatment and the like needs to be separately performed and is limited in the degree of improvement in performance required to separate oil and water, such as affinity of a separation material for moisture.

Accordingly, there is a demand for the development of a separation material which is simply prepared as an adsorptive material capable of separating oil and water in a large area in a short period of time, facilitates large-scale oil-water separation work, is economical, and has high oil-water separation efficiency due to having high performance required for separating oil and water, such as affinity for moisture, an oil absorption amount, or the like.

DISCLOSURE

Technical Problem

The present invention is directed to providing a separation material which is prepared by a simple process, facilitates large-scale oil-water separation work, is economical, and has high oil-water separation efficiency due to having high performance for separating oil and water, such as affinity for moisture, an oil absorption amount, or the like.

Technical Solution

One aspect of the present invention provides a complex which includes: a polymer matrix having a cavernous porous structure; a zinc oxide particle layer formed on the polymer matrix; and a superhydrophobic coating layer formed on the zinc oxide particle layer, wherein the superhydrophobic coating layer includes one or more compounds selected from the group consisting of a C10 to C30 fatty acid and a silane compound substituted with a C4 to C20 fluorinated alkyl group and a halogen group.

Another aspect of the present invention provides a method of preparing a complex, which includes: forming a zinc oxide particle layer on a surface of a polymer matrix by immersing a polymer matrix having a cavernous porous structure in a zinc oxide precursor solution and performing microwave irradiation; and forming a superhydrophobic coating layer on a surface of the polymer matrix by immersing the polymer matrix in a solution containing one or more compounds selected from the group consisting of a C10 to C30 fatty acid and a silane compound substituted with a C4 to C20 fluorinated alkyl group and a halogen group.

Still another aspect of the present invention provides an oil-water separation material which includes the above-described complex.

Advantageous Effects

A complex according to the present invention is prepared by a simple process and exhibits lipophilicity, superhydrophobicity, and super water repellency such that not only high oil-water separation efficiency but also excellent durability are exhibited. In addition, when a magnetic particle layer exhibiting magnetism is provided between a zinc oxide particle layer and a superhydrophobic coating layer, the positional control and collection of the complex are easy such that the complex can be helpfully used as an oil-adsorptive oil-water separation material used in large-scale oil-water separation such as the removal of oil spilled into the ocean.

DESCRIPTION OF DRAWINGS

FIG. 1 shows images illustrating the scanning electron microscope (SEM) analysis results of (a) a melamine sponge (MS) which is an untreated group and (b) a complex (MS/ZnO/SA+FDTS) prepared in Example 1.

FIG. 2 shows SEM images of (a) a polyurethane sponge (PU) which is an untreated group, (b) a complex (PU/ZnO) prepared in Comparative Example 4, and (c) a complex (PU/ZnO/$Fe_3O_4$/SA) prepared in Example 3, and (d) shows images illustrating the scanning electron microscopy-energy dispersive X-ray spectroscopy (SEM-EDS) analysis results of the untreated group PU and the complexes prepared in Comparative Example 4 and Example 3.

FIG. 3 is a graph illustrating the Fourier transform-infrared spectroscopy (FT-IR) results of a melamine sponge (MS) which is an untreated group and a complex (MS/ZnO/SA+FDTS) prepared in Example 1.

FIGS. 4 and 5 are graphs illustrating the X-ray photoelectron spectroscopy (XPS) results of a melamine sponge (MS) and a polyurethane sponge (PU) which are untreated groups and complexes prepared in Examples 1 and 3.

FIG. 6 is a graph illustrating the X-ray diffraction (XRD) analysis results of a polyurethane sponge (PU) which is an untreated group and complexes prepared in Example 3 and Comparative Example 4.

FIG. 7 is a graph illustrating the results of measuring the water contact angle (WCA) of a melamine sponge (MS) which is an untreated group and complexes prepared in Example 1 and Comparative Example 1.

FIG. 8 is a graph illustrating the results of measuring the WCA of a polyurethane sponge (PU) which is an untreated group and complexes prepared in Example 3 and Comparative Examples 4 and 5.

FIG. 9 is a graph illustrating the results of measuring the magnetization of a $Fe_3O_4$ particle which is a magnetic particle and a complex ($PU/ZnO/Fe_3O_4/SA$) prepared in Example 3 before and after separation of oil and water.

FIG. 10 is a graph illustrating the oil-water separation efficiency of a complex (MS/ZnO/SA+FDTS) prepared in Example 1 according to the type of oil.

FIG. 11 is a graph illustrating the oil-water separation efficiency of a complex (MS/ZnO/SA+FDTS) prepared in Example 1 according to the number of times of reuse and the type of oil.

FIG. 12 is a graph illustrating the maximum average absorption amount of a complex ($PU/ZnO/Fe_3O_4/SA$) prepared in Example 3 according to the number of times of reuse and the type of oil.

FIG. 13 is a graph illustrating the WCA of a complex ($PU/ZnO/Fe_3O_4/SA$) prepared in Example 3 before and after an evaluation according to a durability evaluation method.

MODES OF THE INVENTION

The present invention relates to an oil-water separation material and a preparation method thereof.

Recently, as environmental issues have emerged as important issues, the interest in oil-water separation materials for removing pollutants present in water has increased. In addition, as research on high-performance separation materials, the application of the same, and the diversification of the application area of the same has been actively conducted, the demand for the separation materials is increasing.

As an oil-water separation method commonly used in conventional cases, there are a specific gravity separation method, an adsorption method, and the like. Among these methods, an in-depth study is being conducted on the development of an optimal preparation process of a separation material, which is used in the adsorption method, for manifesting the characteristics thereof and a separation material having high functionality provided through a surface treatment technique. As an example, a technique of improving the oil-water separation capacity of the polymer material used as a disc or filter in the adsorption method by modifying the surface of the polymer material through a plasma surface treatment technique has been developed. However, the technique that has been developed up so far has high preparation costs because a surface treatment process such as plasma treatment and the like needs to be separately performed and is limited in the degree of improvement in performance required to separate oil and water, such as affinity of a separation material for moisture.

Accordingly, the present invention provides a complex based on a polymer matrix having a cavernous porous structure and an oil-water separation material including the same.

Since the complex according to the present invention is prepared by microwave irradiation, a preparation process is simple, and since a zinc oxide particle layer with a micro-nano structure and a superhydrophobic coating layer having low surface energy are sequentially formed on a surface of a polymer matrix having a cavernous porous structure, the complex not only exhibits excellent durability but also has a large average BET specific surface area and a large maximum average oil absorption amount. In addition, the complex has high oil-water separation efficiency by exhibiting lipophilicity, superhydrophobicity, and super water repellency, and, when a magnetic particle layer exhibiting magnetism is provided between the zinc oxide particle layer and the superhydrophobic coating layer, the positional control and collection of the complex are easy such that the complex may be helpfully used as an oil-adsorptive oil-water separation material used in large-scale oil-water separation such as the removal of oil spilled into the ocean.

Hereinafter, the present invention will be described in further detail.

Complex

According to an embodiment of the present invention provides a complex based on a polymer matrix.

Specifically, the complex according to the present invention includes a polymer matrix having a cavernous porous structure, a zinc oxide particle layer with a micro-nano structure in which zinc oxide particles agglomerate on a surface of the polymer matrix, and a superhydrophobic coating layer which covers a surface of the zinc oxide particle layer.

Hereinafter, each component of the complex according to the present invention will be described in further detail.

First, the complex according to the present invention includes a polymer matrix which is economical due to having low preparation costs, and the polymer matrix may include one or more polymers selected from the group consisting of melamine resin and polyurethane. The polymer matrix including melamine resin may exhibit high hardness, and the polymer matrix including polyurethane may exhibit high elasticity.

In addition, the polymer matrix includes an open pore and the open pore may have an average size or diameter of 50 μm to 1,000 μm. Specifically, the open pore may have an average size of 100 μm to 1,000 μm, 250 μm to 1,000 μm, 500 μm to 1,000 μm, 750 μm to 1,000 μm, 500 μm to 1,000 μm, 100 μm to 800 μm, 100 μm to 600 μm, 100 μm to 400 μm, 100 μm to 200 μm, 200 μm to 300 μm, 300 μm to 400 μm, 300 μm to 500 μm, 400 μm to 500 μm, 300 μm to 600 μm, 50 μm to 400 μm, 50 μm to 300 μm, 50 μm to 200 μm, 50 μm to 100 μm, 250 μm to 500 μm, 80 μm to 180 μm, or 100 μm to 160 μm. According to the present invention, by including the cavernous polymer matrix including an open pore having a diameter as described above, the complex may realize high elasticity and thus exhibits excellent durability.

As an example, the complex has a stress of 0.0003 to 0.00045 MPa, specifically, 0.0003 to 0.00043 MPa, 0.0003 to 0.00039 MPa, 0.00031 to 0.000415 MPa, 0.0003 to 0.00037 MPa, 0.0003 to 0.00035 MPa, 0.0003 to 0.00033 MPa, 0.00031 to 0.00033 MPa, 0.00035 to 0.00043 MPa, 0.00031 to 0.00043 MPa, 0.00039 to 0.00044 MPa, 0.00039 to 0.00042 MPa, or 0.00041 to 0.00043 MPa, when compressed with 50% or 70% strain at room temperature (21±2° C.). This is equivalent to that of a polyurethane sponge or melamine resin sponge which is conventionally commercially available in the art, suggesting that the complex according to the present invention is highly resistant to an external force due to having high elasticity and thus exhibits high durability.

Next, the complex according to the present invention includes a zinc oxide particle layer which is formed on a surface of the polymer matrix and has a structure in which two or more zinc oxide particles densely agglomerate, for example, in a flame or snowflake shape or in a randomly radial shape based on any one point on the surface of the polymer matrix. By including the zinc oxide particle layer with a structure in which zinc oxide particles agglomerate in a flame or snowflake shape or in a randomly radial shape on the surface of the polymer matrix, the complex may exhibit higher surface roughness and a larger average BET specific surface area than those of a zinc oxide particle layer in which zinc oxide particles are not formed or vertically grown on the matrix surface. The conventional zinc oxide particles are known to have high affinity for water by including a hydroxy group (—OH group) on the surface thereof. However, according to the complex according to the present invention, since zinc oxide particles agglomerate in a flame or snowflake shape or in a randomly radial shape such that high surface roughness and a large surface area are exhibited, the area in contact with oil may be increased, and when a water-containing liquid is brought into contact with the surface, it is possible to induce the formation of a lot of air pockets, thereby further increasing water repellency.

In this case, when the zinc oxide particle layer has a structure in which zinc oxide particles agglomerate in a randomly radial shape, the zinc oxide particles may have an average length of 1 µm to 10 µm and an average thickness of 0.1 µm to 2 µm, and a ratio (L/D) of an average length (L) to an average thickness (D) may range from 2 to 10. More specifically, the zinc oxide particles may have an average length of 1 µm to 8 µm, 1 µm to 6 µm, 1 µm to 4 µm, 2 µm to 10 µm, 4 µm to 10 µm, 6 µm to 10 µm, 8 µm to 10 µm, 2 µm to 8, 4 µm to 6 µm, 5 µm to 7 µm, 3 µm to 7.5 µm 5 µm to 6.5 µm, or 4.5 µm to 7.5 µm and an average thickness of 0.1 µm to 1.5 µm, 0.1 µm to 1 µm, 0.5 µm to 1.5 µm, 1 µm to 1.5 µm, 0.6 µm to 1.0 µm, or 0.8 µm to 1.3 µm. In addition, the zinc oxide particles may have a ratio (L/D) of an average length (L) to an average thickness (D) of 2 to 8, 2 to 5, 2 to 3, 4 to 10, 6 to 10, 8 to 10, 2.5 to 7.5, 3 to 7.5, 3 to 7, 4 to 8, 4 to 6, or 3 to 5.

Next, the complex according to the present invention includes a superhydrophobic coating layer which covers the zinc oxide particle layer, and the superhydrophobic coating layer may include one or more compounds selected from the group consisting of a C10 to C30 fatty acid and a silane compound substituted with a C4 to C20 fluorinated alkyl group and a halogen group, which have low surface energy.

Specifically, the fatty acid may include one or more selected from the group consisting of C10 capric acid, C12 lauric acid, C14 myristic acid, C16 palmitic acid, C18 stearic acid, C20 arachidic acid, and C22 behenic acid and more specifically include stearic acid.

In addition, the silane compound may be a silane compound substituted with, for example, a fluorinated alkyl group such as a perfluorohexyl group, a perfluorooctyl group, a perfluorodecyl group, a perfluorododecyl group, or the like and a halogen group such as a chloro group, a bromo group, or the like. For example, the superhydrophobic coating layer may include one or more selected from the group consisting of perfluorohexyltrichlorosilane, perfluorooctyltrichlorosilane, perfluorodecyltrichlorosilane (FDTS), and perfluorododecyltrichlorosilane and specifically include FDTS.

In addition, the superhydrophobic coating layer may have an average thickness which is able to sufficiently lower surface energy without degrading the surface roughness of the complex. The superhydrophobic coating layer may have an average thickness of 20 nm or less and specifically have an average thickness of 15 nm or less, 10 nm or less, 0.5 nm to 10 nm, or 2 nm to 8 nm.

Furthermore, the complex according to the present invention may further include a magnetic particle layer exhibiting magnetism between the zinc oxide particle layer and the superhydrophobic coating layer. In this case, the magnetic particle layer may cover the entire surface of the zinc oxide particle layer and, in some cases, may be adsorbed onto some parts of the surface of the zinc oxide particle layer and cover the same.

In addition, the magnetic particle layer may include magnetic particles. Specifically, the magnetic particle layer may include magnetic particles which exhibits magnetism and includes one or more of magnetic substances such as pure iron oxide, ferrite, magnetite, and an alloy thereof with a divalent metal. As an example, the magnetic particle layer may include magnetic particles including $Fe_3O_4$.

According to the present invention, since the complex includes the magnetic particle layer, the positional control and collection of the complex are easy. Specifically, when used in large-scale oil-water separation such as the removal of oil spilled into the ocean, the complex may be allowed to easily move to a place where oil floating on the sea surface is located using a magnet, and the complex that has absorbed oil may be easily collected after the separation of oil and water.

In general, the polymer matrix including one or more of melamine resin and polyurethane generally has high affinity for water and thus completely absorbs the water in contact with the surface thereof during the measurement of a static water contact angle, so it is not possible to measure the contact angle. However, the complex according to the present invention may exhibit maximized surface roughness by including the zinc oxide particle layer with a structure in which zinc oxide particles agglomerate in a flame or snowflake shape or in a randomly radial shape on the surface of the polyurethane matrix and, simultaneously, may realize both superhydrophobicity and lipophilicity on the surface by forming the superhydrophobic coating layer having low surface energy as the outermost layer of the complex.

As an example, the complex may have an average static water contact angle of 150° or more, which indicates affinity for water, and more specifically have an average static water contact angle of 150° to 180°, 160° to 180°, 165° to 180°, 150° to 170°, 150° to 160°, 160° to 170°, 155° to 165°, 157° to 165°, 157° to 162°, 159° to 164°, 160° to 162°, 161° to 176°, 165° to 177°, 167° to 175°, 169° to 173°, 169° to 171°, 170° to 174°, or 172° to 174°.

As another example, the complex may have an average sliding water contact angle and an average shedding water contact angle of 15° or less, which indicate water repellency, and more specifically have an average sliding water contact angle and an average shedding water contact angle of 15° or less, 13° or less, 11° or less, 9° or less, 7° or less, 0.5° to 15°, 0.5° to 13°, 0.5° to 11°, 0.5° to 10°, 0.5° to 7°, 5° to 15°, 5° to 13°, 5° to 11°, 9° to 11°, 5° to 10°, 8° to 10°, 8° to 13°, 3° to 9°, 4° to 9°, 5° to 9°, 6° to 8°, 7° to 9°, 6° to 9°, 1° to 8°, 1° to 5°, 2° to 7°, 2° to 5°, 3° to 5°, 1° to 3°, or 1.5° to 4.5°.

As still another example, the complex has very high affinity for an organic material such as oil and the like and thus completely absorbs the oil in contact with the surface thereof during the measurement of an average static oil contact angle, so it may not be possible to measure the static oil contact angle. In this case, the average static oil contact angle may be considered to be 0°.

For example, the complex according to the present invention may have an average static water contact angle of 161±0.5° or 172±1° and an average sliding water contact angle and an average shedding water contact angle of 8±0.5° and 7±0.5° or of 4±0.5° and 2±0.5°, respectively.

Meanwhile, by including the zinc oxide particle layer and the superhydrophobic coating layer on the polymer matrix, the complex according to the present invention may exhibit peaks indicating the binding of a zinc element (Zn), an oxygen element (O), a nitrogen element (N), and a carbon element (C) at 1022±0.5 eV, 533±0.5 eV, 400±0.5 eV, and 284.6±0.6 eV, respectively, as analyzed via X-ray photoelectron spectroscopy (XPS). In addition, when the complex further includes the magnetic particle layer containing iron oxide particles between the zinc oxide particle layer and the superhydrophobic coating layer, the complex may further exhibit a peak indicating the binding of an iron element (Fe) at 711±0.5 eV. The peaks shown by XPS analysis indicate the binding relationship between elements contained in the complex, and the intensity of the peaks may vary depending on the relative bond amount, which may be controlled by adjusting the content of components contained in the complex. The complex of the present invention includes the zinc oxide particle layer and the superhydrophobic coating layer on the polymer matrix in amounts such that the surface roughness and surface energy of the complex may be optimized, so that an intensity ratio (Pc/Po) of a 284.6±0.6 eV peak (Pc) indicating the 1s binding energy of a carbon element (C) and a 533±0.5 eV peak (Po) indicating the 1s binding energy of an oxygen element (O) may range from 1 to 3, as analyzed via XPS. More specifically, the intensity ratio (Pc/Po) of peaks indicating the 1s binding energy of a carbon element and the 1s binding energy of an oxygen element may range from 1.3 to 3, 1.5 to 3, 1.8 to 3, 2 to 3, 2.5 to 3, 1 to 2.5, 1 to 2, 1.5 to 2.5, 1.8 to 2.7, or 2.1 to 2.5. According to the present invention, the intensity ratio of peaks indicating the binding energy of a carbon element (C) and an oxygen element (O) may be adjusted within the above-described range in the analysis of the complex via XPS so as to optimize the surface roughness and surface energy of the complex.

Therefore, since the zinc oxide particle layer with a micro-nano structure, the magnetic particle layer exhibiting magnetism, and the superhydrophobic coating layer which lowers surface energy are sequentially formed on the polyurethane matrix having a cavernous porous structure, the complex according to the present invention not only exhibits excellent durability but also has a large average BET specific surface area and a large maximum average oil absorption amount. In addition, the complex has high oil-water separation efficiency by exhibiting lipophilicity, superhydrophobicity, and super water repellency, and when the magnetic particle layer exhibiting magnetism is provided between the zinc oxide particle layer and the superhydrophobic coating layer, the positional control and collection of the complex using a magnet is enabled such that the complex may be helpfully used as an oil-adsorptive oil-water separation material used in large-scale oil-water separation such as the removal of oil spilled into the ocean.

Method of Preparing Complex

According to another embodiment of the present invention provides a method of preparing a complex, which includes: forming a zinc oxide particle layer on a surface of a polymer matrix by immersing a polymer matrix having a cavernous porous structure in a zinc oxide precursor solution and performing microwave irradiation; and forming a superhydrophobic coating layer on a surface of the polymer matrix by immersing the polymer matrix in a solution containing one or more compounds selected from the group consisting of a C10 to C30 fatty acid and a silane compound substituted with a C4 to C20 fluorinated alkyl group and a halogen group.

According to the method of preparing a complex of the present invention, a complex may be prepared by forming a zinc oxide particle layer with a structure in which zinc oxide particles agglomerate in a flame or snowflake shape or in a randomly radial shape on the surface of a polymer matrix having a cavernous porous structure and coating the zinc oxide particle layer formed on the surface of the polymer matrix with one or more of a fatty acid and a silane compound to form a superhydrophobic coating layer.

Specifically, in the formation of a zinc oxide particle layer on the surface of a polymer matrix, a zinc oxide particle layer having high surface roughness and a structure in which zinc oxide particles agglomerate in a flame or snowflake shape or in a randomly radial shape on the polymer matrix may be formed by immersing a polymer matrix in a zinc oxide precursor solution having a pH of 9 to 12 and containing a zinc ion ($Zn^{2+}$) dissolved therein at a predetermined concentration and then performing microwave irradiation.

In this case, the zinc oxide precursor solution may be a solution having a pH of 9 to 12 and containing a zinc ion ($Zn^{2+}$) dissolved therein at a concentration of 0.1 M to 2 M, specifically, 0.1 M to 1.5 M, 0.1 M to 1.2 M, 0.1 M to 1 M, 0.1 M to 0.8 M, 0.1 M to 0.6 M, 0.1 M to 0.5 M, 0.1 M to 0.3 M, 0.3 M to 0.5 M, 0.4 M to 0.7 M, 0.5 M to 1 M, 0.7 M to 1 M, 1 M to 1.5 M, 0.8 M to 1.2 M, or 0.15 M to 0.25 M by adding ammonia water to an aqueous solution containing a zinc oxide precursor, such as zinc acetate ($Zn(OAc)_2$), zinc chloride ($ZnCl_2$), zinc hydroxide ($Zn(OH)_2$), zinc nitrate ($Zn(NO_3)_2$), or the like, dissolved therein at a concentration of 0.1 M to 2 M. In the present invention, the concentration of the zinc ion ($Zn^{2+}$) present in the zinc oxide precursor solution may be adjusted within the above-described range to uniformly form zinc oxide particles on the surface of the polymer matrix. In addition, the morphology and growth direction of zinc oxide particles formed on the matrix surface may be controlled, and the shape in which zinc oxide particles agglomerate may be adjusted to be a flame or snowflake shape or a randomly radial shape, thereby the surface roughness of the complex may be maximized.

In addition, the microwaves may have an output of 1,000 W to 1,500 W, specifically, 1,000 W to 1,400 W, 1,050 W to 1,300 W, or 1,080 W to 1,200 W, and a frequency of 2,000 MHz to 3,000 MHz, specifically, 2,200 MHz to 2,600 MHz, or 2,400 MHz to 2,500 MHz.

In addition, the microwave irradiation may include: an irradiation step in which a polymer matrix is irradiated with microwaves; and an aging step in which the polymer matrix irradiated with microwaves is allowed to stand, and the irradiation step and the aging step may be repeated n times (n is an integer of 10 or less).

In this case, the irradiation step may be performed for 10 to 100 seconds, specifically, 10 to 80 seconds, 20 to 80 seconds, 30 to 70 seconds, 40 to 80 seconds, 50 to 70 seconds, 30 to 100 seconds, 50 to 100 seconds, 70 to 100 seconds, or 55 to 65 seconds.

In addition, the aging step may be performed for 1 to 60 seconds, specifically, 1 to 50 seconds, 1 to 40 seconds, 5 to 40 seconds, 10 to 40 seconds, 20 to 40 seconds, 30 to 60 seconds, 50 to 60 seconds, or 25 to 35 seconds.

As an example, the microwave irradiation includes: an irradiation step in which a polymer matrix is irradiated with microwaves for 57 to 62 seconds; and an aging step in which the polymer matrix irradiated with microwaves is allowed to stand for 27 to 32 seconds, and the irradiation step and the aging step may be repeated two times.

In the present invention, the microwave irradiation and aging of the polymer matrix immersed in the zinc oxide precursor solution may be repeated for a specific time so as to consistently maintain the temperature of the zinc oxide precursor solution and polymer matrix, control the morphology and growth direction of zinc oxide particles formed on the surface of the polymer matrix, and adjust the shape in which zinc oxide particles agglomerate to become a flame or snowflake shape or a randomly radial shape, thereby the surface roughness of the complex may be maximized.

In addition, in the formation of a superhydrophobic coating layer by coating the formed zinc oxide particle layer, a superhydrophobic coating layer may be formed by immersing the polymer matrix including the zinc oxide particle layer formed on the surface thereof in a solution containing one or more of a fatty acid and a silane compound for 1 minute to 10 minutes (dip coating).

In this case, when the solution contains a fatty acid alone, the fatty acid may be contained at a concentration of 0.005 M to 0.1 M or 0.005 M to 0.05M. In addition, when the solution contains both a fatty acid and a silane compound, the fatty acid may be contained in an amount of 10 to 30 moles based on 1 mole of the silane compound, specifically, in an amount of 15 to 25 moles or 16 to 20 moles based on 1 mole of the silane compound.

As an example, in the present invention, the polymer matrix including the zinc oxide particle layer formed thereon may be immersed in a hydrophilic solution in which a fatty acid is dissolved at a concentration of 0.01±0.005 M (=10±5 mM) to form a superhydrophobic coating layer.

As another example, in the present invention, the polymer matrix including the zinc oxide particle layer formed thereon may be immersed in a solution containing a fatty acid in an amount of 18±0.5 moles based on 1 mole of a silane compound to form a superhydrophobic coating layer.

In the present invention, the content of the fatty acid and/or the silane compound contained in the superhydrophobic coating layer may be controlled within the above-described range to lower the surface energy of the complex, thereby not only superhydrophobicity may be realized but also water repellency may be induced.

In this case, the fatty acid may include a C10 to C30 fatty acid. Specifically the superhydrophobic coating layer may include one or more selected from the group consisting of C10 capric acid, C12 lauric acid, C14 myristic acid, C16 palmitic acid, C18 stearic acid, C20 arachidic acid, and C22 behenic acid. For example, the complex may include stearic acid in the superhydrophobic coating layer that covers the zinc oxide particle layer.

In addition, the silane compound may be a silane compound substituted with, for example, a fluorinated alkyl group such as a perfluorohexyl group, a perfluorooctyl group, a perfluorodecyl group, a perfluorododecyl group, or the like and a halogen group such as a chloro group, a bromo group, or the like. For example, the superhydrophobic coating layer may include one or more selected from the group consisting of perfluorohexyltrichlorosilane, perfluorooctyltrichlorosilane, perfluorodecyltrichlorosilane (FDTS), and perfluorododecyltrichlorosilane and specifically include FDTS.

In addition, the superhydrophobic coating layer may have an average thickness which is able to sufficiently lower the surface energy without degrading the surface roughness of the complex. Specifically, the superhydrophobic coating layer may have an average thickness of 20 nm or less, specifically, 15 nm or less, 10 nm or less, 0.5 nm to 10 nm, or 2 nm to 8 nm, and the average thickness may be controlled by a duration of the immersion of the polymer matrix in a fatty acid-containing solution and/or a concentration of the solution.

Furthermore, the method of preparing a complex according to the present invention may further include, before the formation of a superhydrophobic coating layer, forming a magnetic particle layer on a surface of the polymer matrix by immersing the polymer matrix including the zinc oxide particle layer formed on the surface thereof in a magnetic particle-containing solution.

Specifically, the formation of a magnetic particle layer may be performed by immersing the polymer matrix including the zinc oxide particle layer formed on the surface thereof in a magnetic particle-containing solution for 30 to 100 minutes or 40 to 70 minutes.

In this case, the magnetic particles may include one or more magnetic substances exhibiting magnetism, such as pure iron oxide, ferrite, magnetite, and an alloy thereof with a divalent metal. As an example, the magnetic particles may include $Fe_3O_4$. When particles including $Fe_3O_4$ are used as magnetic particles, the magnetic particles may be obtained by adding ammonia water to a mixed solution including an iron precursor such as $FeCl_3$ having an oxidation number of 3 and an iron precursor such as $FeCl_2$ having an oxidation number of 2 and inducing a precipitation reaction. In this case, the solution to which ammonia water is added may have a pH of 11 to 12.

In addition, the concentration of the magnetic particle-containing solution may be 0.1 to 5 g/L, specifically, 0.5 to 3 g/L, 0.5 to 1.5 g/L, or 0.8 to 1.2 g/L. In the present invention, the concentration of the magnetic particle-containing solution may be controlled within the above-described range to form the magnetic particle layer, which has a sufficient thickness to impart magnetism to the complex, on the surface of the complex.

Oil-Water Separation Material

According to still another embodiment of the present invention provides an oil-water separation material including the complex according to the present invention.

The oil-water separation material of the present invention may be reused and exhibits high oil-water separation efficiency by including the complex of the present invention which exhibits excellent durability, has a large average BET specific surface area, and exhibits lipophilicity, superhydrophobicity, and super water repellency because a zinc oxide particle layer with a micro-nano structure in which zinc oxide particles agglomerate in a flame or snowflake shape or in a randomly radial shape and a superhydrophobic coating layer are sequentially formed on a polyurethane matrix having a cavernous porous structure.

Specifically, a polymer sponge with a porous structure which is generally used as an oil-water separation material may realize superhydrophobicity when subjected to various surface treatments but does not exhibit water repellency. Therefore, when used for oil separation when oil spills into fresh water and/or the ocean, the polymer sponge remains in water while absorbing a considerable amount of water in addition to oil. However, since the oil-water separation material according to the present invention exhibits super water repellency as well as lipophilicity and superhydrophobicity, it does not sink beneath the water surface while selectively absorbing only oil floating on the water surface when oil spills into fresh water and/or the ocean, resulting in high oil-water separation efficiency and easy disposal after separation of oil and water.

As an example, since the oil-water separation material exhibits lipophilicity, superhydrophobicity, and super water repellency by including the complex according to the present invention, when the separation of oil and water is performed by immobilizing the material in a reactor and pouring, on a surface of the material, a mixed solution including methanol, hexane (n-hexane), toluene, dichloromethane, vacuum oil, gasoline, soy bean oil, canola oil, or diesel and water in a volume ratio of 1:1 or an oil/water emulsion, the oil is absorbed into and passed through the material, but the water is not absorbed into the material and remains on the surface of the material. Separation efficiency with respect to water thus separated may be 95% or more, specifically, 97% or more, based on the volume of water included in the mixed solution.

As another example, since the oil-water separation material exhibits excellent durability by including the complex according to the present invention, when the oil-water separation and washing are performed 50 times or 100 times using a mixed solution including methanol, hexane (n-hexane), toluene, dichloromethane, vacuum oil, gasoline, soy bean oil, canola oil, or diesel and water in a volume ratio of 1:1, separation efficiency with respect to all of the oil components after the 30 times of oil-water separation may be 70% or more or 80% or more, and separation efficiency with respect to a low-molecular and/or low-viscosity component such as methanol, hexane (n-hexane), and the like after the 50 times of oil-water separation may be 80% or more.

Meanwhile, the oil-water separation material according to the present invention may have a maximum average adsorption amount of 20 to 200 g per unit weight (g) and specifically have a maximum average adsorption amount of 20 to 180 g, 20 to 160 g, 20 to 140 g, 20 to 120 g, 20 to 100 g, 20 to 90 g, 20 to 70 g, 20 to 60 g, 20 to 50 g, 20 to 30 g, 30 to 200 g, 50 to 200 g, 70 to 200 g, 90 to 200 g, 100 to 200 g, 120 to 200 g, 140 to 200 g, 160 to 200 g, 180 to 200 g, 25 to 150 g, 30 to 110 g, 30 to 90 g, 30 to 70 g, 30 to 60 g, 35 to 90 g, 35 to 70 g, 35 to 60 g, or 40 to 70 g per unit weight (g). Since the maximum average adsorption amount of the oil-water separation material may be affected by a viscosity of oil to be adsorbed, the oil-water separation material may adsorb oil within the above-described range according to the type of oil to be adsorbed.

As an example, when separating oil and water from a mixed solution including hexane (viscosity: 13.10 mm²/s) and water, the oil-water separation material may have a maximum average adsorption amount of 32.01±0.05 g per unit weight (1 g) with respect to hexane, and when separating oil and water from a mixed solution including diesel (viscosity: 103.99 mm²/s) and water, the oil-water separation material may have a maximum average adsorption amount of 80.98±0.05 g per unit weight (1 g) with respect to diesel.

In addition, the oil-water separation material according to the present invention exhibits excellent durability.

As an example, the oil-water separation material may maintain all of an average static water contact angle, an average sliding water contact angle, and an average shedding water contact angle at about 98% or more because the zinc oxide particle layer and superhydrophobic coating layer formed on the surface of the polymer matrix are not lost even when surface friction or deformation occurs due to ultrasonic wave irradiation or application of a 2,000 gr load.

Hereinafter, the present invention will be described in further detail according to examples and experimental examples.

However, it should be understood that the following examples and experimental examples proposed herein are given for the purpose of illustration only and are not intended to limit the scope of the present invention.

Preparation Example 1. Preparation of Magnetic Particle

Magnetic particles were prepared using a co-precipitation method. Specifically, a 0.1 M $FeCl_3$ solution (100 ml) was mixed with a 0.1 M $FeCl_2$ solution (50 ml) to prepare a mixed solution, and ammonia water was added dropwise to the mixed solution to induce a reaction shown in the following Formula 1, thereby forming a precipitate. In this case, the mixed solution had a temperature of 80±5° C. and a pH of 11 to 12, and the reaction was performed for 3 hours while maintaining the temperature and the pH:

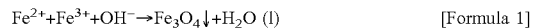

$$Fe^{2+}+Fe^{3+}+OH^-\rightarrow Fe_3O_4\downarrow+H_2O \text{ (l)} \quad\quad \text{[Formula 1]}$$

After the reaction was terminated, the mixed solution was cooled to room temperature and filtered, and then the filtered substance was washed with water and acetone to neutralize a pH of the filtered substance. Then, the neutralized substance was dried in a 60° C. oven for 12 hours and pulverized using a grinder to obtain magnetic particles ($Fe_3O_4$ particles).

Example 1. Preparation of MS/ZnO/SA+FDTS Complex

A melamine sponge with a size of 3 cm (width), 3 cm (length), and 3 cm (thickness) was provided, and the provided melamine sponge was washed three times with each of distilled water and ethanol to remove impurities remaining on its surface.

In addition, 25 wt % ammonia water was added dropwise to 100 ml of a 0.2 M aqueous zinc acetate ($Zn(OAc)_2$) solution to completely dissolve white zinc acetate precipitated in the aqueous zinc acetate solution. In this case, the solution had a pH of 10 to 11. The resulting aqueous zinc acetate solution was introduced into a reaction flask, and the above-provided melamine sponge was immersed in the aqueous zinc acetate solution for 30 minutes so that the sponge was completely submerged in the solution and then irradiated with microwaves (output: 1120±20 W and frequency: 2450±10 MHz) using a microwave oven (KR-G20EW manufactured by Daewoo Electronics) typically used in the art. In this case, after the microwave irradiation, an aging process in which the melamine sponge having been irradiated with microwaves was allowed to stand was subsequently performed, and the irradiation and aging processes were repeated three times. In addition, the single irradiation process in which the melamine sponge was irradiated with microwaves was performed for 60±2 seconds, and the single aging process in which the melamine sponge having been irradiated with microwaves was allowed to stand was performed for 30±2 seconds. After all of the processes were completed, the aqueous zinc acetate solution was cooled to room temperature (20±1° C.) over 10 minutes, and then the melamine sponge having been immersed in the aqueous zinc acetate solution was taken out of the solution, washed with distilled water and ethanol, and air-dried. The dried melamine sponge was immersed in a mixed solution including a 10 mM stearic acid solution (90 ml, stearic acid content: 900 mmol) in a dissolved state in ethanol and a 5 mM perfluorodecyltrichlorosilane (FDTS) solution (10 ml, FDTS content: 50 mmol) in a dissolved state in ethanol for 5 minutes, then taken out of the solution, and air-dried to prepare a complex (MS/ZnO/SA+FDTS). In this case, the superhydrophobic coating layer formed on the surface had an average thickness of 3 to 8 nm.

Example 2. Preparation of PU/ZnO/SA+FDTS Complex

A complex (PU/ZnO/SA+FDTS) was prepared in the same manner as in Example 1 except that a polyurethane sponge was used instead of a melamine sponge.

Example 3. Preparation of PU/ZnO/Fe$_3$O$_4$/SA Complex

A polyurethane sponge with a size of 3 cm (width), 3 cm (length), and 3 cm (thickness) was provided, and the provided polyurethane sponge was washed three times with each of distilled water and ethanol to remove impurities remaining on its surface.

In addition, 25 wt % ammonia water was added dropwise to 100 ml of a 1 M aqueous zinc acetate (Zn(OAc)$_2$) solution to completely dissolve white zinc acetate precipitated in the aqueous zinc acetate solution. In this case, the solution had a pH of 10.5±0.3. The resulting aqueous zinc acetate solution was introduced into a reaction flask, and the above-provided polyurethane sponge was immersed in the aqueous zinc acetate solution so that the sponge was completely submerged in the solution and then irradiated with microwaves (output: 1120±20 W and frequency: 2450±10 MHz) using a microwave oven (KR-G20EW manufactured by Daewoo Electronics) typically used in the art. In this case, after the microwave irradiation, an aging process in which the polyurethane sponge having been irradiated with microwaves was allowed to stand was subsequently performed, and the irradiation and aging processes were repeated three times. In addition, the single irradiation process in which the polyurethane sponge was irradiated with microwaves was performed for 60±2 seconds, and the single aging process in which the polyurethane sponge having been irradiated with microwaves was allowed to stand was performed for 30±2 seconds. After all of the processes were completed, the aqueous zinc acetate solution was cooled to room temperature (20±1° C.) over 5 minutes, and then the polyurethane sponge having been immersed in the aqueous zinc acetate solution was taken out of the solution, washed with distilled water, and air-dried. The magnetic particles (Fe$_3$O$_4$ particles, 0.1 g) obtained in Preparation Example 1 were dispersed in ethanol (100 ml), and the dried polyurethane sponge was immersed therein at room temperature (20±2° C.) for an hour to form a magnetic particle layer on the surface of the polyurethane sponge. The surface of the polyurethane sponge having been immersed was washed with distilled water, and the washed polyurethane sponge was immersed in a 10 mM stearic acid solution (100 ml) in a dissolved state in ethanol for 5 minutes, then taken out of the solution, and air-dried to prepare a complex (PU/ZnO/Fe$_3$O$_4$/SA). In this case, the stearic acid layer thus formed on the surface had an average thickness of 8 to 12 nm.

Example 4. Preparation of MS/ZnO/Fe$_3$O$_4$/SA Complex

A complex (MS/ZnO/Fe$_3$O$_4$/SA) was prepared in the same manner as in Example 3 except that a melamine sponge was used instead of a polyurethane sponge.

Comparative Example 1. Preparation of MS/ZnO Complex

A melamine sponge with a size of 3 cm (width), 3 cm (length), and 3 cm (thickness) was provided, and the provided melamine sponge was washed three times with each of distilled water and ethanol to remove impurities remaining on its surface.

In addition, 25 wt % ammonia water was added dropwise to 100 ml of a 1 M aqueous zinc acetate (Zn(OAc)$_2$) solution to completely dissolve white zinc acetate precipitated in the aqueous zinc acetate solution. In this case, the solution had a pH of 10 to 11. The resulting aqueous zinc acetate solution was introduced into a reaction flask, and the above-provided melamine sponge was immersed in the aqueous zinc acetate solution so that the sponge was completely submerged in the solution and then irradiated with microwaves (output: 1120±20 W and frequency: 2450±10 MHz) using a microwave oven (KR-G20EW manufactured by Daewoo Electronics) typically used in the art. In this case, after the microwave irradiation, an aging process in which the melamine sponge having been irradiated with microwaves was allowed to stand was subsequently performed, and the irradiation and aging processes were repeated three times. In addition, the single irradiation process in which the melamine sponge was irradiated with microwaves was performed for 60±2 seconds, and the single aging process in which the melamine sponge having been irradiated with microwaves was allowed to stand was performed for 30±2 seconds. After all of the processes were completed, the aqueous zinc acetate solution was cooled to room temperature (20±1° C.) over 5 minutes, and then the melamine sponge having been immersed in the aqueous zinc acetate solution was taken out of the solution, washed with distilled water, and air-dried to prepare a complex (MS/ZnO).

Comparative Example 2. Preparation of MS/ZnO/SA Complex

A complex (MS/ZnO/SA) was prepared in the same manner as in Example 1 except that a melamine sponge including a zinc oxide particle layer formed thereon was immersed in a 10 mM stearic acid solution (100 ml) instead of a mixed solution including a stearic acid solution and a FDTS solution. In this case, the stearic acid layer thus formed on the surface had an average thickness of 3 to 8 nm.

Comparative Example 3. Preparation of MS/ZnO/FDTS Complex

A complex (MS/ZnO/FDTS) was prepared in the same manner as in Example 1 except that a melamine sponge including a zinc oxide particle layer formed thereon was immersed in a 5 mM FDTS solution (100 ml) instead of a mixed solution including a stearic acid solution and a FDTS solution. In this case, the silane coating layer thus formed on the surface had an average thickness of 3 to 8 nm.

Comparative Example 4. Preparation of PU/ZnO Complex

A polyurethane sponge with a size of 3 cm (width), 3 cm (length), and 3 cm (thickness) was provided, and the provided polyurethane sponge was washed three times with each of distilled water and ethanol to remove impurities remaining on its surface.

In addition, 25 wt % ammonia water was added dropwise to 100 ml of a 1 M aqueous zinc acetate ($Zn(OAc)_2$) solution to completely dissolve white zinc acetate precipitated in the aqueous zinc acetate solution. In this case, the solution had a pH of 10 to 11. The resulting aqueous zinc acetate solution was introduced into a reaction flask, and the above-provided polyurethane sponge was immersed in the aqueous zinc acetate solution so that the sponge was completely submerged in the solution and then irradiated with microwaves (output: 1120±20 W and frequency: 2450±10 MHz) using a microwave oven (KR-G20EW manufactured by Daewoo Electronics) typically used in the art. In this case, after the microwave irradiation, an aging process in which the polyurethane sponge having been irradiated with microwaves was allowed to stand was subsequently performed, and the irradiation and aging processes were repeated three times. In addition, the single irradiation process in which the polyurethane sponge was irradiated with microwaves was performed for 60±2 seconds, and the single aging process in which the polyurethane sponge having been irradiated with microwaves was allowed to stand was performed for 30±2 seconds. After all of the processes were completed, the aqueous zinc acetate solution was cooled to room temperature (20±1° C.) over 5 minutes, and then the polyurethane sponge having been immersed in the aqueous zinc acetate solution was taken out of the solution, washed with distilled water, and air-dried to prepare a complex (PU—ZnO).

Comparative Example 5. Preparation of PU/SA Complex

A polyurethane sponge with a size of 3 cm (width), 3 cm (length), and 3 cm (thickness) was provided, and the provided polyurethane sponge was washed three times with each of distilled water and ethanol to remove impurities remaining on its surface. The polyurethane sponge was immersed in a 10 mM solution (100 ml) of stearic acid in ethanol for 5 minutes, then taken out of the solution, and air-dried to prepare a complex (PU/SA). In this case, the stearic acid layer formed on the surface had an average thickness of 8 to 12 nm.

Experimental Example 1

In order to confirm the surface characteristics of the complex according to the present invention, the complex (MS/ZnO/SA+FDTS) prepared in Example 1 and a melamine sponge (MS) which was an untreated group were photographed using a scanning electron microscope (SEM), and results thereof are shown in FIG. 1.

In addition, the complex (PU/ZnO/$Fe_3O_4$/SA) prepared in Example 3, the complexes (PU/ZnO and PU/SA) prepared in Comparative Examples 4 and 5, and a polyurethane sponge (PU) which was an untreated group were analyzed via scanning electron microscopy-energy dispersive X-ray spectroscopy (SEM-EDS), and results thereof are shown in FIG. 2.

As shown in FIGS. 1 and 2, it can be seen that the complex according to the present invention had a surface structure having high surface roughness by including a zinc oxide particle layer with a micro-nano structure in which zinc oxide particles agglomerate on a polymer matrix and thus exhibited excellent surface characteristics such as a BET surface area and the like.

Specifically, FIG. 1 showed that the complex (MS/ZnO/SA+FDTS) of Example 1 had a surface with a micro-nano structure in which zinc oxide particles agglomerate in a randomly radial shape on a melamine sponge having an open pore. In addition, the pores formed in the complex had an average size of about 100 μm to 150 and the zinc oxide particles agglomerated in a randomly radial shape were rod-shaped particles having an average thickness of about 1 to 1.5 μm and an average length of about 5 to 7 μm.

In addition, FIG. 2 showed that a polyurethane sponge (PU) which was an untreated group and the complex of Comparative Example 5, whose surface was coated with stearic acid (SA), had smooth surfaces, whereas the complex of Comparative Example 4, in which a zinc oxide particle layer was formed on the surface of a polyurethane sponge, had a surface structure in which zinc oxide particles agglomerated in a flame or snowflake shape by applying microwaves in the formation of the zinc oxide particle layer. In addition, in the case of the complex (PU/ZnO/$Fe_3O_4$/SA) of Example 3 including a zinc oxide particle layer formed on a polyurethane sponge in the same manner as in the complex of Comparative Example 4 and further including a superhydrophobic coating layer on the surface of the formed zinc oxide particle layer, the zinc oxide particle layer was more densely self-assembled through strong coordination between the carboxyl groups of stearic acid contained in the superhydrophobic coating layer and zinc oxide particles. Additionally, the magnetic particle layer of the complex of Example 3 was confirmed to maintain surface roughness that was realized by the zinc oxide particle layer, and a carbon element (C), an oxygen element (O), a zinc element (Zn), and an iron element (Fe) were uniformly distributed throughout the complex.

From these results, it can be seen that the complex according to the present invention exhibits maximized surface roughness and excellent surface characteristics such as an average BET specific surface area and the like by including a zinc oxide particle layer with a micro-nano structure in which zinc oxide particles agglomerate in a flame or snowflake shape or in a randomly radial shape on the surface of a cavernous porous polymer matrix having a three-dimensional open pore.

Experimental Example 2

In order to confirm the surface component of the complex according to the present invention, a melamine sponge (MS) which was an untreated group and the complex (MS/ZnO/SA+FDTS) prepared in Example 1 were analyzed via Fourier transform-infrared spectroscopy (FT-IR) in an infrared region of 1,000 to 4,000 $cm^{-1}$ after respective KBr pellets were prepared, and results thereof are shown in FIG. 3.

In addition, a melamine sponge (MS), a polyurethane sponge (PU), the complex (MS/ZnO/SA+FDTS) prepared in Example 1, and the complex (PU/ZnO/$Fe_3O_4$/SA) prepared in Example 3 were measured via X-ray photoelectron spectroscopy (XPS), and results thereof are shown in FIGS. 4 and 5.

In addition, a polyurethane sponge (PU) which was an untreated group, the complex (PU/ZnO/Fe$_3$O$_4$/SA) prepared in Example 3, and the complex (PU/ZnO) prepared in Comparative Example 4 were measured via X-ray diffraction (XRD). In the measurement, XRD patterns were obtained in the 2θ range between 10° and 80° by irradiation at a wavelength of 1.5406 Å and a velocity of 0.02°/sec using D8 (commercially available from Bruker (Germany), CuKa radiation, 40 kV, 30 mA). Measurement results are shown in FIG. 6.

FIG. 3 is a graph illustrating the FT-IR results of a melamine sponge (MS) which was an untreated group and a complex (MS/ZnO/SA+FDTS) prepared in Example 1. Referring to FIG. 3, unlike an untreated melamine sponge (MS), the complex (MS/ZnO/SA+FDTS) of Example 1 was confirmed to exhibit peaks indicating symmetrical and asymmetrical stretching vibration of an alkylene group (—CH$_2$—) derived from stearic acid (SA) at 2862±2 cm$^{-1}$ and 2930±2 cm$^{-1}$. In addition, the complex (MS/ZnO/SA+FDTS) of Example 1 was confirmed to exhibit peaks indicating stretching vibration of a haloalkylene group (C—F) derived from FDTS at 1150 to 1250 cm$^{-1}$.

FIG. 4 is a graph illustrating XPS results of an untreated melamine sponge (MS) and the complex (MS/ZnO/SA+FDTS) prepared in Example 1. Referring to FIG. 4, a melamine sponge (MS) was confirmed to exhibit peaks indicating the 1s binding of an oxygen element (O), a nitrogen element (N), and a carbon element (C), and an intensity ratio ($P_{CO}/P_{N0}$) of the C peak and the N peak was about 0.9 to 1.1. On the other hand, the complex (MS/ZnO/SA+FDTS) of Example 1 was confirmed to exhibit peaks indicating the 2p3 binding of a zinc element (Zn) of zinc oxide at 1022±5 eV in addition to peaks indicating the 1s binding of an oxygen element (O), a nitrogen element (N), and a carbon element (C), and an intensity ratio ($P_{C1}/P_{N1}$) of the C peak and the N peak was about 1.35 to 1.6 due to stearic acid contained in the superhydrophobic coating layer. In addition, due to the silane compound substituted with a fluorinated alkyl group contained in the superhydrophobic coating layer, that is, FDTS, peaks indicating the 1s binding of a fluorine element (F) were exhibited at 690±5 eV.

These results mean that, in the case of the complex (MS/ZnO/SA+FDTS) prepared in Example 1, a zinc oxide particle layer is located on a polymer matrix, and the surface thereof is covered with a superhydrophobic coating layer including a fatty acid and a silane compound.

FIG. 5 shows graphs illustrating XRD analysis results of an untreated polyurethane sponge (PU) and the complexes (PU/ZnO/Fe$_3$O$_4$/SA and PU/ZnO) prepared in Example 3 and Comparative Example 4. Referring to FIG. 5, unlike an untreated polyurethane sponge (PU), the complexes of Example 3 and Comparative Example 4 were confirmed to exhibit peaks produced from zinc oxide particles at 2θ=32.01±0.5°, 34.17±0.5°, 36.20±0.5°, 47.35±0.5°, 56.62±0.5°, 62.92±0.5°, 66.92±0.5°, 68.03±0.5°, and 69.09±0.5°. In addition, since the complex (PU/ZnO/Fe$_3$O$_4$/SA) of Example 3 includes a Fe$_3$O$_4$ particle layer including magnetic particles on a zinc oxide particle layer, the complex was confirmed to further exhibit peaks at 2θ=30.1±0.5°, 43.1±0.5°, and 53.5±0.5° in addition to the above-described peaks.

FIG. 6 is a graph illustrating XPS results of an untreated polyurethane sponge (PU) and the complex (PU/ZnO/Fe$_3$O$_4$/SA) prepared in Example 3. Referring to FIG. 6, a polyurethane sponge (PU) was confirmed to exhibit peaks indicating the 1s binding of a carbon element (C), a nitrogen element (N), and an oxygen element (O) at 533±0.5 eV, 400±0.5 eV, and 284.6±0.6 eV, respectively, and an intensity ratio ($P_c/P_o$) of the C peak and the O peak was about 0.7 to 0.9. On the other hand, the complex (PU/ZnO/Fe$_3$O$_4$/SA) of Example 3 was confirmed to exhibit peaks indicating the 1s binding of a carbon element (C), a nitrogen element (N), and an oxygen element (O) at 533±0.5 eV, 400±0.5 eV, and 284.6±0.6 eV, respectively, like an untreated polyurethane sponge (PU) and further exhibit peaks indicating the 2p3 binding of a zinc element (Zn) of zinc oxide at 1022±5 eV and peaks indicating the 2p1/2 and 2p3/2 binding of an iron element (Fe) of Fe$_3$O$_4$ at 724±0.5 eV and 711±0.5 eV, respectively, and an intensity ratio ($P_c/P_o$) of the C peak and the O peak was about 2.2 to 2.4 due to stearic acid.

From these results, in the case of the complex (PU/ZnO/Fe$_3$O$_4$/SA) prepared in Example 3, it can be seen that a zinc oxide particle layer and a magnetic particle layer are uniformly located on a polyurethane sponge, and the surface thereof is uniformly covered with a fatty acid.

Experimental Example 3

In order to evaluate the physical properties of the complex according to the present invention, experiments were conducted as follows.
a) Evaluation of Affinity for Water An untreated melamine sponge (MS), an untreated polyurethane sponge (PU), and the complexes prepared in Examples 1 and 3 and Comparative Examples 1 to 5 were measured for a static water contact angle (static WCA), a sliding water contact angle (sliding WCA), a shedding water contact angle (shedding WCA), and a static oil contact angle using a contact angle analysis device (SmartDrop manufactured by Femtofab Co. Ltd). In this case, each measurement was performed by dropping a 10 μl water or oil droplet on the surface for each measurement and repeated three times, and an average value thereof was calculated. Results thereof are shown in the following Table 1 and FIGS. 7 and 8.

TABLE 1

| | Water (H$_2$O) | | |
|---|---|---|---|
| | Static contact angle | Sliding contact angle | Shedding contact angle |
| Melamine sponge | not determined | not determined | not determined |
| Polyurethane sponge | not determined | not determined | not determined |
| Example 1 | 173.0 ± 1° | 4.0 ± 1.0° | 2.0 ± 1.0° |
| Example 3 | 161.0 ± 1° | 8.0 ± 0.5° | 7.0 ± 0.5° |
| Comparative Example 1 | 90.0 ± 1° | not determined | not determined |
| Comparative Example 2 | 159.0 ± 1° | 10.0 ± 0.3° | 8.0 ± 0.3° |
| Comparative Example 3 | 160.0 ± 1° | 10.0 ± 0.3° | 8.0 ± 0.3° |
| Comparative Example 4 | 119.0 ± 1° | 35.0 ± 1° | 30.0 ± 1° |
| Comparative Example 5 | 92.0 ± 1° | 54.0 ± 1° | 52.0 ± 1° |

As shown in Table 1 and FIGS. 7 and 8, it can be seen that the complex according to the present invention realized superhydrophobicity, water repellency, and lipophilicity on the surface thereof.

Specifically, the complexes prepared in Examples 1 and 3 were confirmed to have a static WCA of 160° to 162° and 171° to 175°, respectively, which indicates affinity for water and a sliding WCA and a shedding WCA of 9° or less and 7.5° or less, specifically, 3° to 9° and 1° to 7.6°, respectively, which indicate water repellency. In addition, the complex completely absorbed oil such that it is not possible to measure a static oil contact angle which indicates lipophilicity.

On the other hand, an untreated melamine sponge (MS) or an untreated polyurethane sponge (PU) completely absorbed both water and oil which were dropped on the surface during the measurement of contact angles due to having high affinity for both water and oil such that it is not possible to measure a static WCA, a static oil contact angle, a sliding WCA, and a shedding WCA. In addition, the complexes prepared in Comparative Examples 1 to 5 exhibited hydrophobicity by including a zinc oxide particle layer having high surface roughness or a superhydrophobic coating layer on respective surfaces but exhibited a low static WCA due to a low level of hydrophobicity and a sliding WCA and a shedding WCA higher than those of the complex of the present invention due to having considerably low water repellency.

These results mean that, in order to realize superhydrophobicity and water repellency, it is required to increase the surface roughness of the complex by including a zinc oxide particle layer and, simultaneously, lower the surface energy of the complex by including a superhydrophobic coating layer.

Therefore, it can be seen that the complex according to the present invention exhibits not only considerably high affinity for oil but also is excellent in superhydrophobicity and water repellency by having a structure in which a superhydrophobic coating layer covers the surface of a zinc oxide particle layer with a micro-nano structure in which zinc oxide particles agglomerate on a polymer matrix.

B) Magnetic Properties

The magnetic hysteresis (M-H) loops of $Fe_3O_4$ particles which are magnetic particles and the complex (PU/ZnO/$Fe_3O_4$/SA) prepared in Example 3 were measured at room temperature (25±1° C.). In addition, after the separation of oil and water using the complex (PU/ZnO/$Fe_3O_4$/SA) of Example 3 was repeated 20 times, the magnetic hysteresis (M-H) loop of the complex was measured again at room temperature (25±1° C.), and results thereof are shown in FIG. 9.

Referring to FIG. 9, the complex (PU/ZnO/$Fe_3O_4$/SA) of Example 3 was confirmed to exhibit a saturation magnetization ($M_s$) of about 5±0.02 emu/g, and, after the separation of oil and water using the complex was repeated 100 times, a saturation magnetization ($M_s$) of about 2.5 emu/g was maintained.

These results mean that the complex according to the present invention exhibits magnetism by including $Fe_3O_4$ particles which are magnetic particles, and the magnetism is maintained constantly even after the repeated use of the complex.

Experimental Example 4

In order to evaluate the oil-water separation efficiency of the complex according to the present invention, an experiment was conducted as follows.

Each of an untreated melamine sponge (MS), an untreated polyurethane sponge (PU), and the complexes prepared in Examples 1 and 3 and Comparative Examples 1 to 3 was cut into a diameter of 7±2 cm and a height of 1 cm and immobilized in a tube provided with a stainless steel mesh as a stopper and having a diameter of 7 cm, and a beaker was provided under the tube. Afterward, a mixed solution (30 ml) including oil and water in a volume ratio of 1:1 was introduced into the tube, and the tube was maintained until the oil contained in the solution was completely passed through an untreated melamine sponge (MS), an untreated polyurethane sponge (PU), or the individual complexes. In this case, as the oil mixed with water, methanol, hexane (n-hexane), toluene, dichloromethane, gasoline, vacuum oil, soy bean oil, canola oil, or diesel may be used, or an emulsion including water and oil mixed in a ratio of 1:1 was used. After the oil contained in the solution was completely absorbed into and passed through the untreated sponges or the individual complexes, a volume of the water that did not pass through and remained on the untreated sponges or the individual complexes was measured. From the measurement result, oil and water separation efficiency was derived using the following Formula 2, and a maximum average oil absorption amount per unit weight of the complex (based on 1 g) was calculated. This process was repeated 50 times or 100 times. Among the derived results, results for the complex (MS/ZnO/SA+FDTS) of Example 1 are shown in Table 2 and FIGS. 10 and 11, and results for the complex (PU/ZnO/$Fe_3O_4$/SA) of Example 3 are shown in Table 3 and FIG. 12.

$$\text{Oil-water separation efficiency } (k) = V_1/V_0 \times 100 \qquad \text{[Formula 2]}$$

In Formula 2, $V_1$ represents the volume of water remaining on the top of a polyurethane sponge or complex after separation, and $V_0$ represents the volume of water contained in the mixed solution before separation.

TABLE 2

| Units: % | Methanol | Hexane | Vacuum oil | Gasoline | Canola oil | Diesel |
| --- | --- | --- | --- | --- | --- | --- |
| 1 time | 99.99 | 99.82 | 98.99 | 98.20 | 98.39 | 98.21 |
| 5 times | 99.55 | 98.23 | 96.56 | 97.99 | 94.32 | 96.22 |
| 10 times | 99.11 | 97.01 | 95.36 | 96.25 | 93.89 | 92.50 |
| 15 times | 98.32 | 96.32 | 90.23 | 95.32 | 94.09 | 87.22 |
| 20 times | 95.32 | 95.21 | 89.36 | 92.10 | 92.33 | 85.36 |
| 25 times | 93.00 | 95.00 | 86.32 | 90.00 | 91.33 | 83.22 |
| 30 times | 90.64 | 94.32 | 76.12 | 83.21 | 87.23 | 80.33 |
| 35 times | 88.20 | 90.02 | 63.05 | 77.32 | 82.01 | 67.06 |
| 40 times | 87.33 | 88.32 | 55.99 | 72.01 | 77.67 | 61.32 |
| 45 times | 86.21 | 87.06 | 49.36 | 68.99 | 71.22 | 57.21 |
| 50 times | 84.32 | 86.32 | 45.22 | 65.09 | 68.23 | 45.32 |

TABLE 3

| Units: g/g | Hexane | Toluene | Dichloromethane | Gasoline | Soy bean oil | Diesel | Vacuum oil |
|---|---|---|---|---|---|---|---|
| Viscosity at room temperature (20 ± 1° C.) | 0.32 cP | 0.58 cP | 0.4 cP | 0.6 cP | 80 cP | — | — |
| Maximum average absorption amount | 32.01 ± 0.1 g/g | 49.0 ± 0.1 g/g | 58.1 ± 0.1 g/g | 59.2 ± 0.1 g/g | 65.1 ± 0.1 g/g | 80.98 ± 0.1 g/g | 108.9 ± 0.1 g/g |
| Separation efficiency | 99.89% | 99.88% | 99.87% | 99.5% | 99.2% | 99.0% | 98.21% |

As a result, it can be seen that the complex according to the present invention exhibits high oil-water separation efficiency regardless of the type of oil and can be reused.

Specifically, referring to Table 2 and FIGS. 10 and 11, the complex (MS/ZnO/SA+FDTS) prepared in Example 1 was confirmed to separate water and oil with a high separation efficiency of 95% or more with respect to oils such as hexane, vacuum oil, gasoline, canola oil, and diesel. Especially, the complex separated methanol having hydrophilicity from water with a separation efficiency of about 98% or more. On the other hand, the complexes prepared in Comparative Examples 1 to 3 hardly separated water and oil and thus exhibited a water separation efficiency of less than 10% with respect to oil.

In addition, the complex (MS/ZnO/SA+FDTS) prepared in Example 1 was confirmed to exhibit a high separation efficiency of 80% or more regardless of the type of an oil component after the separation of oil and water from a mixed solution including oil and water in a volume ratio of 1:1 was repeated 30 times. In addition, the complex exhibited a high separation efficiency of 80% or more with respect to an oil component such as hexane (n-hexane) and methanol even after the separation of oil and water was repeated 50 times or more.

Additionally, referring to Table 3 and FIG. 12, the complex (PU/ZnO/Fe$_3$O$_4$/SA) prepared in Example 3 was confirmed to separate water and oil with a high efficiency of 98% or more with respect to oils such as hexane, toluene, dichloromethane, gasoline, vacuum oil, soy bean oil, and diesel. In addition, the complex was confirmed to have a maximum average oil absorption amount of about 30 to 110 g/g depending on the type of oil, and the maximum average oil absorption amount tended to be increased as the viscosity of oil measured at room temperature was increased.

Furthermore, the complex (PU/ZnO/Fe$_3$O$_4$/SA) of Example 3 was confirmed to retain a maximum average oil absorption amount at 70% or more regardless of an oil component even after the separation of oil and water from the mixed solution was repeated 30 times and also retain a maximum average oil absorption amount at 80% or more with respect to a low-molecular and/or low-viscosity component such as hexane (n-hexane) even after the separation of oil and water was repeated 50 times or more. This is because the oil that is absorbed into pores of the complex during the separation of oil and water remains to decrease the total amount of oil subsequently absorbed.

From these results, it can be seen that the complex according to the present invention exhibits high oil-water separation efficiency and can be reused because a zinc oxide particle layer with a micro-nano structure in which zinc oxide particles agglomerate and a superhydrophobic coating layer are sequentially formed on a polymer matrix having a cavernous porous structure.

Experimental Example 5

In order to evaluate the durability of the complex according to the present invention, an external force was applied to the complex prepared in Example 1 or 3 by the following four methods, the WCA before and after the application of the external force were measured, and the change in WCA was confirmed:

[Method 1] Each of an untreated melamine sponge (MS) and the complex (MS/ZnO/SA+FDTS) prepared in Example 1 was cut into a diameter of 7±2 cm and a height of 1 cm and immobilized in a universal testing machine, and then the stress of the complex was measured while compressing the complex with 50% or 70% strain at room temperature (21±2° C.). In addition, the static WCA of the compressed complex was measured, and results thereof are shown in Table 4.

[Method 2] Each of an untreated polyurethane sponge (PU) and the complex (PU/ZnO/Fe$_3$O$_4$/SA) prepared in Example 3 was immersed in water and then irradiated with ultrasonic waves using a sonicator at room temperature (22±2° C.) for 30 minutes. Afterward, the complex was air-dried, and the WCA of the complex was measured.

[Method 3] Each of an untreated polyurethane sponge (PU) and the complex (PU/ZnO/Fe$_3$O$_4$/SA) prepared in Example 3 was moved back and forth three times under a load of 2,000 gr per unit area at the speed of 1 cm/s, and then the WCA of the complex was measured.

[Method 4] Each of an untreated polyurethane sponge (PU) and the complex (PU/ZnO/Fe$_3$O$_4$/SA) prepared in Example 3 was cut into a size of 3 cm (width), 3 cm (length), and 3 cm (height), and while holding both ends of the complex, twisting in both directions was repeated 3 times so that the angle of twist became 180°, and then the WCA of the complex was measured. Results thereof are shown in FIG. 13 together with results of the Methods 2 and 3.

TABLE 4

| | Untreated group | | Complex of Example 1 | |
|---|---|---|---|---|
| Strain | 50% | 70% | 50% | 70% |
| Stress (MPa) | 0.00032 ± 0.00005 | 0.000399 ± 0.00005 | 0.000318 ± 0.00005 | 0.00041 ± 0.00005 |
| Static WCA | — | — | 171 ± 1° | 170 ± 1° |

Referring to Table 4, the complex (MS/ZnO/SA+FDTS) prepared in Example 1 was confirmed to have a stress of 0.00031 to 0.00042, which was equivalent to that of a melamine sponge (MS) having high elasticity, when subjected to 50% or 70% strain. In addition, the complex (MS/ZnO/SA+FDTS) prepared in Example 1 was confirmed to realize a high static WCA of 165° or more by maintaining surface energy and surface roughness even after being subjected to strain.

Referring to FIG. 13, the complex (PU/ZnO/$Fe_3O_4$/SA) prepared in Example 3 was confirmed to maintain all of an average static WCA, an average sliding WCA, and an average shedding WCA at about 98% or more because the zinc oxide particle layer, magnetic particle layer, and superhydrophobic coating layer formed on the surface of a polyurethane sponge (PU) were not lost even when surface friction or deformation occurred due to ultrasonic wave irradiation or application of a 2,000 gr load.

From these results, it can be seen the complex according to the present invention realizes excellent superhydrophobicity and excellent water repellency due to having excellent durability even when the external force is applied.

INDUSTRIAL APPLICABILITY

A complex according to the present invention is prepared by a simple process and exhibits lipophilicity, superhydrophobicity, and super water repellency such that not only high oil-water separation efficiency but also excellent durability are exhibited. In addition, when a magnetic particle layer exhibiting magnetism is provided between a zinc oxide particle layer and a superhydrophobic coating layer, the positional control and collection of the complex are easy such that the complex can be helpfully used as an oil-adsorptive oil-water separation material used in large-scale oil-water separation such as the removal of oil spilled into the ocean.

The invention claimed is:
1. A water repellency complex for oil-water separation comprising:
   a polymer sponge having a cavernous porous structure;
   a zinc oxide particle layer formed on the polymer sponge; and
   a superhydrophobic coating layer formed on the zinc oxide particle layer,
   wherein the superhydrophobic coating layer includes C10 to C30 fatty acid and a silane compound substituted with a C4 to C20 fluorinated alkyl group and a halogen group,
   wherein the polymer sponge includes one or more polymers selected from the group consisting of melamine resin and polyurethane,
   wherein the zinc oxide particle layer has a micro-nano structure in which zinc oxide particles are agglomerated in a flame or snowflake shape on the surface of the polymer sponge,
   wherein the zinc oxide particles have an average length of 2 μm to 10 μm and an average thickness of 0.1 μm to 2 μm, and a ratio (L/D) of an average length (L) to an average thickness (D) ranges from 2 to 10,
   wherein the fatty acid includes one or more selected from the group consisting of capric acid, lauric acid, myristic acid, stearic acid, arachidic acid, and behenic acid,
   wherein the complex has an average sliding water contact angle and an average shedding water contact angle of 7°, and
   wherein the complex has an average static water contact angle of 170° to 180°.

2. The water repellency complex for oil-water separation of claim 1, wherein the polymer sponge includes an open pore, and the pore has an average size of 50 μm to 1,000 μm.

3. The water repellency complex for oil-water separation of claim 1, wherein the silane compound includes one or more selected from the group consisting of perfluorohexyltrichlorosilane, perfluorooctyltrichlorosilane, perfluorodecyltrichlorosilane, and perfluorododecyltrichlorosilane.

4. The water repellency complex for oil-water separation of claim 1, wherein the superhydrophobic coating layer has an average thickness of 20 nm or less.

5. The water repellency complex for oil-water separation of claim 1, wherein the water repellency complex for oil-water separation exhibits binding peaks at 1022±0.5 eV, 533±0.5 eV, 400±0.5 eV, and 284.6±0.6 eV as analyzed via X-ray photoelectron spectroscopy (XPS), and an intensity ratio (Pc/Po) of a peak (Pc) indicating the 1s binding of a carbon element and a peak (Po) indicating the 1s binding of an oxygen element ranges from 1 to 3.

6. An oil-water separation material comprising the water repellency complex for oil-water separation of claim 1.

7. The material of claim 6, wherein the oil-water separation material has a maximum average oil adsorption amount of 20 to 200 g per unit weight (g).

* * * * *